(12) United States Patent
Ebata et al.

(10) Patent No.: US 9,193,856 B2
(45) Date of Patent: Nov. 24, 2015

(54) COPOLYMER, RUBBER COMPOSITION, CROSS-LINKED RUBBER, CROSS-LINKED FOAM, AND USES THEREOF

(75) Inventors: Hiroki Ebata, Yokohama (JP); Akinori Takehara, Chiba (JP); Mitsunao Arino, Ichihara (JP); Masao Kunizane, Sodegaura (JP); Yoshiharu Kikuchi, Ichihara (JP); Takayuki Kajihara, Funabashi (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 13/130,746

(22) PCT Filed: Nov. 26, 2009

(86) PCT No.: PCT/JP2009/069963
§ 371 (c)(1),
(2), (4) Date: May 23, 2011

(87) PCT Pub. No.: WO2010/064574
PCT Pub. Date: Jun. 10, 2010

(65) Prior Publication Data
US 2011/0233448 A1 Sep. 29, 2011

(30) Foreign Application Priority Data

Dec. 1, 2008 (JP) ................................. 2008-306736
Mar. 27, 2009 (JP) ................................. 2009-079015

(51) Int. Cl.
| | | |
|---|---|---|
| C08F 210/18 | (2006.01) | |
| C08F 4/6592 | (2006.01) | |
| C08L 23/16 | (2006.01) | |
| C08F 232/08 | (2006.01) | |

(52) U.S. Cl.
CPC ............... C08L 23/16 (2013.01); C08F 210/18 (2013.01); C08F 4/6592 (2013.01); C08F 232/08 (2013.01); C08L 2203/14 (2013.01); C08L 2312/00 (2013.01); C08L 2314/06 (2013.01)

(58) Field of Classification Search
CPC ...... C08F 210/18; C08F 4/6592; C08L 23/16; C08L 2203/14; C08L 2312/02; C08L 2314/06
USPC .................. 526/160, 165, 336, 337, 339, 943
See application file for complete search history.

(56) References Cited

U.S. PATENT DOCUMENTS

| | | | |
|---|---|---|---|
| 5,698,651 | A | 12/1997 | Kawasaki et al. |
| 6,610,800 | B2 | 8/2003 | Laughner et al. |
| 7,005,492 | B2 | 2/2006 | Sassa |
| 7,838,611 | B2 | 11/2010 | Yamada et al. |
| 2007/0015893 | A1 | 1/2007 | Hakuta et al. |

FOREIGN PATENT DOCUMENTS

| | | |
|---|---|---|
| EP | 2 221 338 A1 | 8/2010 |
| JP | 62-121709 | 6/1987 |
| JP | 09-071616 | 3/1997 |
| JP | 2000-290414 | 10/2000 |
| JP | 2000-344980 | 12/2000 |
| JP | 2002-037962 | 2/2002 |
| JP | 2002-275302 | 9/2002 |
| JP | 2003-507541 | 2/2003 |
| JP | 2004-197080 | 7/2004 |
| JP | 2004-197082 | 7/2004 |
| JP | 2004-197107 | 7/2004 |
| JP | 2004-292709 | 10/2004 |
| JP | 2005-263842 | 9/2005 |
| JP | 2006-225415 | 8/2006 |
| JP | 2007-169339 | 7/2007 |

(Continued)

OTHER PUBLICATIONS

Carman, C., et al. "Monomer Sequence Distribution in Ethylene-Propylene Rubber Measured by $^{13}$C NMR. 3. Use of Reaction Probability Model", Macromolecules, 1977, vol. 10, No. 3, pp. 536-544.

Hakuta, T. "Technology for Obtaining Foamed Rubber and Latest Technological Trends", Nippon Gomu Kyokaisi (the journal of SRIJ), 2003, vol. 76, No. 6, pp. 212-218.

Harrington, B., et al. "Ethylene Elastomers: A Comparison of Conventional Ziegler-Natta and Metallocene Products", American Chemical Society, Rubber Division, Technical Meeting, Oct. 14-17, 2003, No. 4, pp. 1-11.

(Continued)

*Primary Examiner* — Caixia Lu
(74) *Attorney, Agent, or Firm* — Foley & Lardner LLP

(57) ABSTRACT

The present invention provides a rubber composition having adequate foamability, uses thereof, a copolymer contained in the rubber composition, a rubber composition capable of providing a cross-linked foam, which has a low specific gravity and an excellent shape-retaining property even when the usage of a nonconjugated polyene is reduced, and a cross-linked rubber and a cross-linked foam, which are produced from the rubber composition. A copolymer (A) according to the present invention is a copolymer including structural units derived from ethylene [A], an α-olefin [B], a nonconjugated polyene [C-1], in which one carbon-carbon double bond (C=C) polymerizable with a metallocene catalyst is present in one molecule, and a nonconjugated polyene [C-2], in which two bonds of C=C polymerizable with the metallocene catalyst are present in one molecule, and being synthesized with the metallocene catalyst, wherein (1) the units derived from the component [B] constitute 10 to 50 percent by mole, (2) the total of the units derived from the component [C-1] and the units derived from the component [C-2] is 1.0 to 6.0 percent by mole, (3) the molar ratio of the units derived from the component [C-1] to the units derived from the component [C-2] is 75/25 to 99.5/0.5, (4) [ML (1+4) 100° C.] is 10 to 200, and (5) 50>activation energy of fluidization (kJ/mol) >35 is satisfied.

12 Claims, 1 Drawing Sheet

(56) References Cited

FOREIGN PATENT DOCUMENTS

| WO | WO-98/49212 | 11/1998 |
| WO | WO-2007/077732 A1 | 7/2007 |

OTHER PUBLICATIONS

Hsieh, E., et al. "Ethylene-1-Butene Copolymers. 1. Comonomer Sequence Distribution", Macromolecules, 1982, vol. 15, No. 2, pp. 353-360.

International Search Report in PCT/JP2009/069963 dated Jan. 26, 2010.

Kakugo, M., et al. "$^{13}$C NMR Determination of Monomer Sequence Distribution in Ethylene-Propylene Copolymers Prepared with $\delta$-TiCl$_3$-Al(C$_2$H$_5$)$_2$Cl", Macromolecules, 1982, vol. 15, No. 4, pp. 1150-1152.

Kameda, H. "Rubber Blend for Extrusion", Nippon Gomu Kyokaisi (The Journal of SRIJ), 1996, vol. 69, No. 5, pp. 365-374. Partial English translation.

Lasarov, H., et al. "2D NMR characterization of poly(ethylene-*co*-5-vinyl-2-norbornene), Macromolecular Rapid Communications, 1999, vol. 20, No. 6, pp. 356-360.

Lasarov, H., et al. "Ethylene-Norbornene Terpolymerization with 5-Vinyl-2-norbornene Using Single-Site Catalysts", Macromolecular Rapid Communications, Apr. 5, 2001, vol. 22, No. 6, pp. 434-438.

Lindeman, L., et al. "Carbon-13 Nuclear Magnetic Resonance Spectrometry", Analytical Chemistry, Aug. 1971, vol. 43, No. 10, pp. 1245-1252.

Randall, James C. "A Review of High Resolution Liquid $^{13}$Carbon Nuclear Magnetic Resonance Characterizations of Ethylene-Based Polymers", Journal of Macromolecular Science-Reviews in Macromolecular Chemistry and Physics, 1989, vol. C29, No. 2 and 3, pp. 201-317.

Ray, G., et al. "Carbon-13 Nuclear Magnetic Resonance Determination of Monomer Composition and Sequence Distributions in Ethylene-Propylene Copolymers Prepared with a Stereoregular Catalyst System", Macromolecules, 1977, vol. 10, No. 4, pp. 773-778.

Stadler, F., et al. "Influence of Short-Chain Branching of Polyethylenes on the Temperature Dependence of Rheological Properties in Shear", Macromolecular Chemistry and Physics, 2007, vol. 208, No. 22, pp. 2449-2454.

Van Der Velden, G. "$^{13}$C NMR Study of the Nonconjugated Diene Incorporated in Ethylene-Propylene-Diene Terpolymers", Macromolecules, 1983, vol. 16, No. 1, pp. 85-89.

Yamaguchi, M., "Basic Properties of Molten Bodies", Seikei-Kakou, 2008, vol. 20, No. 7, pp. 400-404. Partial English translation.

Communication including Supplementary European Search Report in 09830341.5 dated May 29, 2012.

COPOLYMER, RUBBER COMPOSITION, CROSS-LINKED RUBBER, CROSS-LINKED FOAM, AND USES THEREOF

TECHNICAL FIELD

The present invention relates to a copolymer, a rubber composition containing the copolymer, a cross-linked rubber, a cross-linked foam, and uses thereof. In more detail, the present invention relates to a copolymer capable of providing a cross-linked rubber and a cross-linked foam, which have low specific gravities and excellent shape-retaining properties, a rubber composition containing the copolymer, a cross-linked rubber and a cross-linked foam, which are produced from the rubber composition, and uses thereof.

BACKGROUND ART

Ethylene.propylene.diene copolymer rubber (EPDM) has no double bond in the main chain of the molecular structure thereof and, therefore, exhibits excellent heat aging resistance, weather resistance, and ozone resistance as compared with general-purpose conjugated diene rubber, and has been applied widely to uses, e.g., automobile components, wire materials, electric electronic components, construction and civil engineering materials, and industrial materials and components.

The EPDM is used for, for example, automobile exterior materials e.g., glass run channels and weather strip sponges, and radiator hose materials. In recent years, the need for weight reduction of products has been intensified and the EPDM exhibiting excellent foamability has been desired.

Control of a vulcanization reaction and a foaming reaction is required for preparing a foam produced from a composition containing the EPDM. Furthermore, it is necessary to increase the viscosity of the foaming medium and the effective amount of the produced gas (gas-retaining property) in order to improve the foamability. At that time, it is believed that an increase in high-molecular weight component of the EPDM and introduction of a branch structure in the EPDM are effective for the purpose of improving the gas-retaining property and the shape stability (refer to Non-Patent Documents 1 and 2, for example). However, a composition containing the EPDM having an adequate foamability has not yet been proposed.

Moreover, a sponge rubber which has an excellent shape-retaining property while being lightweight and flexible has been desired as the material for the above-described uses, and a cross-linked foam has been proposed, which is produced from the EPDM containing at least one diene component or a composition thereof. For example, Patent Document 1 discloses an ethylene.α-olefin.nonconjugated diene copolymer rubber, in which 5-ethylidene-2-norbornene (ENB) is used as the diene component, which exhibits excellent shape-retaining property and kneadability, and in addition, which is excellent in compression set. Patent Document 2 discloses an ethylene.α-olefin.nonconjugated diene copolymer rubber, in which ENB and dicyclopentadiene are used as nonconjugated dienes, and discloses a sponge, in which the above-described rubber is used, which is highly foamed, and which is excellent in compression set. Regarding the compositions containing the EPDM described in Patent Documents 1 and 2, the extrudability and the balance between the vulcanization rate and the mechanical strength of the vulcanized rubber are improved as compared with those of the conventional composition containing the EPDM, but a composition containing the EPDM and having an adequate balance has not yet been produced.

Furthermore, in order to produce the EPDM described in Non-Patent Documents 1 and 2, it is necessary to use large amounts of expensive nonconjugated polyene, e.g., ENB or VNB. Therefore, there still is room for improvement from the viewpoint of reduction in production cost.

Under such circumstances, it is desired that a composition capable of providing a cross-linked foam, which has a low specific gravity and an excellent shape-retaining property and which is excellent from the viewpoint of the production cost, is further proposed.

PRIOR ART DOCUMENTS

Patent Document

[Patent Document 1] JP-A-2005-263842
[Patent Document 2] JP-A-2006-225415

Non-Patent Document

[Non-Patent Document 1] Takashi Hakuta, "NIPPON GOMU KYOKAISI (the journal of SRIJ)", Vol. 76, p. 212 (2003)
[Non-Patent Document 2] Hiroshi Kameda, "NIPPON GOMU KYOKAISI (the journal of SRIJ)", Vol. 69, p. 365 (1996)

DISCLOSURE OF THE INVENTION

Problems to be Solved by the Invention

The object of the present invention is to provide a rubber composition having adequate foamability, uses thereof, and a copolymer contained in the rubber composition.

Furthermore, the object of the present invention is to provide a rubber composition capable of providing a cross-linked foam, which has a low specific gravity and an excellent shape-retaining property even when the usage of a nonconjugated polyene used for producing a copolymer is reduced, and a cross-linked rubber and a cross-linked foam, which are produced from the rubber composition.

Means for Solving the Problems

The present inventors conducted intensive research to achieve the above-described objects. As a result, it was found that a rubber composition containing a copolymer through the use of two types of specific polyene had an adequate foamability and the rubber composition was able to provide a cross-linked rubber and a cross-linked foam, which had low specific gravities and excellent shape-retaining properties. Consequently the present invention has been completed.

That is, the present invention includes the following items.

[1] A copolymer (A) including structural units derived from ethylene [A], an α-olefin [B] having 3 to 20 carbon atoms, a nonconjugated polyene [C-1], in which among carbon-carbon double bonds, only one carbon-carbon double bond polymerizable with a metallocene catalyst is present in one molecule, and a nonconjugated polyene [C-2], in which among the carbon-carbon double bonds, two carbon-carbon double bonds polymerizable with the metallocene catalyst are present in one molecule, and being synthesized through the use of the metallocene catalyst, wherein (1) the structural units derived from the α-olefin [B] having 3 to 20 carbon atoms constitute 10 to 50 percent by mole in 100 percent by mole of the total structural units, (2) the total of the percent by mole of the structural units derived from the nonconjugated polyene [C-1], in which among carbon-carbon double bonds, only one carbon-carbon double bond polymerizable with the metallocene catalyst is present in one molecule, and the percent by mole of the structural units derived from the nonconjugated polyene [C-2], in which among the carbon-carbon double bonds, two carbon-carbon double bonds polymerizable with the metallocene catalyst are present in one molecule, is 1.0 to 6.0 percent by mole, (3) the ratio ([C-1]/[C-2]) of the percent by mole of the structural units derived from the nonconjugated polyene [C-1], in which among carbon-carbon double bonds, only one carbon-carbon double bond polymerizable with the metallocene catalyst is present in one molecule, to the percent by mole of the structural units derived from the nonconjugated polyene [C-2], in which among the carbon-carbon double bonds, two carbon-carbon double bonds polymerizable with the metallocene catalyst are present in one molecule, is 75/25 to 99.5/0.5, (4) the Mooney viscosity [ML (1+4) 100° C.] measured at 100° C. is 10 to 200, and (5) the following formula (I) is satisfied.

$$50 > \text{activation energy of fluidization } (Ea)[\text{kJ/mol}] > 35 \quad (I)$$

[2] The copolymer (A) according to the item [1], wherein (4) the Mooney viscosity [ML (1+4) 100° C.] measured at 100° C. is 10 to 90.

[3] The copolymer (A) according to the item [1] or the item [2], wherein the apparent iodine value of the structural units derived from the above-described nonconjugated polyene [C-2], in which among the carbon-carbon double bonds, two carbon-carbon double bonds polymerizable with the metallocene catalyst are present in one molecule, is 0.1 to 3.0 g/100 g.

[4] The copolymer (A) according to any one of the items [1] to [3], wherein the above-described nonconjugated polyene [C-1], in which among carbon-carbon double bonds, only one carbon-carbon double bond polymerizable with the metallocene catalyst is present in one molecule, is 5-ethylidene-2-norbornene (ENB), and the above-described nonconjugated polyene [C-2], in which among the carbon-carbon double bonds, two carbon-carbon double bonds polymerizable with the metallocene catalyst are present in one molecule, is 5-vinyl-2-norbornene (VNB).

[9] The copolymer (A) according to any one of the items [1] to [4], which is synthesized through the use of a catalyst having the structure represented by the following formula (III').

[Chemical formula 1]

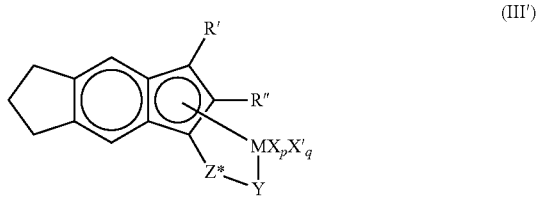

In the formula (III'), R' represents a hydrogen atom or a hydrocarbyl group having 1 to 20 carbon atoms, R" represents a hydrocarbyl group having 1 to 20 carbon atoms or a hydrogen atom, M represents titanium, Y represents —NR*—, Z* represents —SiR*$_2$—, the above-described R*s represent independently a hydrogen atom or a hydrocarbyl group having 1 to 20 carbon atoms, one of p and q is 0 and the other is 1, in the case where q is 0 and q is 1, M is in an oxidized state of +2 and X' represents 1,4-diphenyl-1,3-butadiene or 1,3-pentadiene, and in the case where p is 1 and p is 0, M is in an oxidized state of +3, and X represents 2-(N,N-dimethylamino)benzyl.

[6] A rubber composition characterized by including the copolymer (A) according to any one of the items [1] to [5].

[7] A rubber composition including the copolymer (A) according to any one of the items [1] to [5] and at least one type of ethylene-based polymer (B) selected from the group consisting of an ethylene.α-olefin having 3 to 20 carbon atoms.nonconjugated polyene copolymer (excluding the above-described copolymer (A)) (B1), an ethylene.α-olefin copolymer (B2), and an ethylene.polar monomer copolymer (B3).

[8] A rubber composition including 100 parts by weight of the copolymer (A) according to any one of the items [1] to [5] and 1 to 70 parts by weight of foaming agent.

[9] A cross-linked rubber which is produced through cross-linking of the rubber composition according to any one of the items [6] to [8].

[10] A cross-linked foam which is produced through cross-linking foaming of the rubber composition according to any one of the items [6] to [8].

[11] A cross-linked foam which is produced through cross-linking foaming of the rubber composition according to any one of the items [6] to [8] and has a specific gravity of 0.02 to 0.3.

[12] A highly foamed sponge material including the cross-linked foam according to the item [11].

[13] A heat-insulating sponge including the cross-linked foam according to the item [11].

[14] A dam rubber including the cross-linked foam according to the item [11].

Advantages of the Invention

The rubber composition including the copolymer according to the present invention exhibits adequate foamability and, in addition, excellent kneadability. Furthermore, the cross-linked foam according to the present invention has a large expansion ratio and, therefore, a small specific gravity and excellent shape-retaining property, so that the rubber composition can be used for automobile exterior materials e.g., glass run channels and weather strip sponges, and radiator hose materials favorably.

According to the present invention, a cross-linked foam exhibiting excellent foamability can be provided through the use of two types of specific nonconjugated polyene in combination even when the usage of the nonconjugated polyene used for producing a copolymer is reduced.

That is, even when the usage of the polyene is reduced, an ethylene.α-olefin.nonconjugated polyene copolymer having many long-chain branches is obtained by using a diene having a terminal double bond as one of the two types of nonconjugated polyene. In the case where the ethylene.α-olefin.nonconjugated polyene copolymer is blended into the conventional EPDM, outgassing during foaming is suppressed, so that a cross-linked foam having a small specific gravity and an excellent shape-retaining property is obtained.

Moreover, since the nonconjugated polyene is expensive, if the usage thereof can be reduced, there is a production cost advantage.

In addition, according to the present invention, a high performance sponge can be obtained by using a small amount of the above-described specific ethylene.α-olefin.nonconjugated polyene copolymer instead of the EPDM, which has a large compression set and which has been unsuitable for the sponge previously.

BEST MODE FOR CARRYING OUT THE INVENTION

Figure 1:
FIG. 1 shows an example of the shape of a tabular sponge in shape stability evaluation in Example.

A copolymer (A), a rubber composition, a cross-linked rubber, a cross-linked foam, and uses thereof will be described specifically.

[Copolymer (A)]

A copolymer (A) according to the present invention is a copolymer characterized by including structural units derived from ethylene [A], an α-olefin [B] having 3 to 20 carbon atoms, a nonconjugated polyene [C-1], in which among carbon-carbon double bonds, only one carbon-carbon double bond polymerizable with a metallocene catalyst is present in one molecule, and a nonconjugated polyene [C-2], in which among the carbon-carbon double bonds, two carbon-carbon double bonds polymerizable with the metallocene catalyst are present in one molecule, and being synthesized through the use of the metallocene catalyst, wherein (1) the structural units derived from the α-olefin [B] having 3 to 20 carbon atoms constitute 10 to 50 percent by mole in 100 percent by mole of the total structural units, (2) the total of the percent by mole of the structural units derived from the nonconjugated polyene [C-1], in which among carbon-carbon double bonds, only one carbon-carbon double bond polymerizable with the metallocene catalyst is present in one molecule, and the percent by mole of the structural units derived from the nonconjugated polyene [C-2], in which among the carbon-carbon double bonds, two carbon-carbon double bonds polymerizable with the metallocene catalyst are present in one molecule, is 1.0 to 6.0 percent by mole, (3) the ratio ([C-1]/[C-2]) of the percent by mole of the structural units derived from the nonconjugated polyene [C-1], in which among carbon-carbon double bonds, only one carbon-carbon double bond polymerizable with the metallocene catalyst is present in one molecule, to the percent by mole of the structural units derived from the nonconjugated polyene [C-2], in which among the carbon-carbon double bonds, two carbon-carbon double bonds polymerizable with the metallocene catalyst are present in one molecule, is 75/25 to 99.5/0.5, (4) the Mooney viscosity [ML (1+4) 100° C.] measured at 100° C. is 10 to 200, and (5) the following formula (I) is satisfied.

$$50 > \text{activation energy of fluidization } (Ea)[\text{kJ/mol}] > 35 \quad (I)$$

In the present specification, the above-described items (1) to (5) may be referred to as requirements (1) to (5).

The copolymer (A) according to the present invention is a copolymer, wherein the ethylene [A], the α-olefin [B] having 3 to 20 carbon atoms, the nonconjugated polyene [C-1], in which among carbon-carbon double bonds, only one carbon-carbon double bond polymerizable with the metallocene catalyst is present in one molecule, and the nonconjugated polyene [C-2], in which among the carbon-carbon double bonds, two carbon-carbon double bonds polymerizable with the met- allocene catalyst are present in one molecule, serve as monomers and structural units derived from the raw materials are included.

In this regard, in the present specification, the ethylene [A] may be referred to as a component [A], the α-olefin [B] having 3 to 20 carbon atoms may be referred to as a component [B], the nonconjugated polyene [C-1], in which among carbon-carbon double bonds, only one carbon-carbon double bond polymerizable with the metallocene catalyst is present in one molecule, may be referred to as a component [C-1], and the nonconjugated polyene [C-2], in which among the carbon-carbon double bonds, two carbon-carbon double bonds polymerizable with the metallocene catalyst are present in one molecule, may be referred to as a component [C-2].

<Component [B]>

Specific examples of the above-described α-olefin [B] having 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among them, in particular, α-olefins having 3 to 8 carbon atoms, e.g., propylene, 1-butene, 1-hexene, and 1-octene, are preferable. Such α-olefins are favorable because the raw material costs are relatively low and the resulting copolymers (A) exhibit excellent mechanical properties.

In this regard, the copolymer (A) according to the present invention includes structural units derived from at least one type of the α-olefin [B] having 3 to 20 carbon atoms and may include structural units derived from at least two types of the α-olefin [B] having 3 to 20 carbon atoms.

<Component [C-1]>

Examples of the above-described nonconjugated polyene [C-1], in which among carbon-carbon double bonds, only one carbon-carbon double bond polymerizable with the metallocene catalyst is present in one molecule, do not include chain polyenes, in which both terminals are vinyl groups ($CH_2$=CH—), but include polyenes, in which one of the carbon-carbon double bonds is present as a vinyl group at a molecular terminal and the other carbon-carbon double bond (C=C) is present as an internal olefin in a molecular chain (main chain or side chain), for example, cyclic olefins having an internal olefin, e.g., an alkylidene group. These internal olefins are not polymerized with the metallocene catalyst or the polymerizability is poorer than that of the vinyl group. Examples of component [C-1] include aliphatic polyenes and alicyclic polyenes, as described below.

Specific examples of the above-described aliphatic polyenes include 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, and 9-methyl-1,8-undecadiene. In the present invention, at least one type of these aliphatic polyenes can be used alone or in combination. Preferably, 7-methyl-1,6-octadiene and the like are used.

Examples of the above-described alicyclic polyenes include polyenes composed of an alicyclic portion having one carbon-carbon double bond (unsaturated bond) and a chain portion having an internal olefin bond (carbon-carbon double bond), e.g., an alkylidene group, which is not polymerized with the metallocene catalyst or the polymerizability is poor. Specific examples include 5-ethylidene-2-norbornene (ENB), 5-propylidene-2-norbornene, and 5-butylidene-2-norbornene. Among them, 5-ethylidene-2-norbornene (ENB) is preferable. Examples of other alicyclic polyenes include 2-methyl-2,5-norbornadiene and 2-ethyl-2,5-norbornadiene. At least one type of these alicyclic polyenes is used alone or in combination.

In this regard, the copolymer (A) according to the present invention includes at least one type of structural units derived from the component [C-1] and may include at least two types of structural units derived from the component [C-1].

<Component [C-2]>

Specific examples of the above-described nonconjugated polyene [C-2], in which among the carbon-carbon double bonds, two carbon-carbon double bonds polymerizable with the metallocene catalyst are present in one molecule, include 5-alkenyl-2-norbornene, e.g., 5-vinyl-2-norbornene (VNB) and 5-allyl-2-norbornene; alicyclic polyenes, e.g., 2,5-norbornadiene, dicyclopentadiene (DCPD), and tetracyclo[4,4,0,1$^{2.5}$,1$^{7.10}$]deca-3,8-diene; and α,ω-dienes, e.g., 1,7-octadiene and 1,9-decadiene.

Among them, 5-vinyl-2-norbornene (VNB), dicyclopentadiene, 2,5-norbornadiene, 1,7-octadiene, and 1,9-decadiene are preferable, and 5-vinyl-2-norbornene (VNB) is particularly preferable.

In this regard, the copolymer (A) according to the present invention includes at least one type of structural units derived from the component [C-2] and may include at least two types of structural units derived from the component [C-2].

As for the above-described copolymer (A), ethylene.propylene.4,8-dimethyl-1,4,8-decatriene (DMDT)-5-vinyl-2-norbornene (VNB) quatercopolymer, ethylene.propylene.5-butylidene-2-norbornene.5-vinyl-2-norbornene (VNB) quatercopolymer, ethylene.propylene.5-ethylidene-2-norbornene (ENB).5-vinyl-2-norbornene (VNB) quatercopolymer, and the like are preferable, and ethylene.propylene.5-ethylidene-2-norbornene (ENB).5-vinyl-2-norbornene (VNB) quatercopolymer is more preferable.

[Requirement (1)]

In the copolymer (A) according to the present invention, the structural units derived from the α-olefin [B] having 3 to 20 carbon atoms constitute 10 to 50 percent by mole, and preferably 25 to 45 percent by mole in 100 percent by mole of the total structural units.

It is favorable that the structural units (percent by mole) derived from the component [B] is within the above-described range, from the viewpoint of the flexibility and the mechanical characteristics at low temperatures of the cross-linked foam produced from the rubber composition including the copolymer (A) according to the present invention.

Furthermore, the structural units derived from ethylene [A] usually constitute 44 to 89 percent by mole, and preferably 50 to 74 percent by mole in 100 percent by mole of the total structural units.

It is favorable that the structural units (percent by mole) derived, from the component [A] is within the above-described range from the viewpoint of the flexibility and the mechanical characteristics at low temperatures of the cross-linked foam produced from the rubber composition including the copolymer (A) according to the present invention.

In this regard, the above-described molar ratio can be determined on the basis of $^{13}$C-NMR.

[Requirement (2)]

In the copolymer (A) according to the present invention, the total of the percent by mole of the structural units derived from the nonconjugated polyene [C-1], in which among carbon-carbon double bonds, only one carbon-carbon double bond polymerizable with the metallocene catalyst is present in one molecule, and the percent by mole of the structural units derived from the nonconjugated polyene [C-2], in which among the carbon-carbon double bonds, two carbon-carbon double bonds polymerizable with the metallocene catalyst are present in one molecule, is 1.0 to 6.0 percent by mole. Preferably, the above-described total percent by mole is 1.0 to 5.0 percent by mole.

It is preferable that the above-described total percent by mole is within the above-described range because the vulcanization reaction rate can be controlled relatively easily.

In this regard, the above-described total percent by mole can be determined by summing the amounts of moles of ENB and VNB determined on the basis of $^{13}$C-NMR.

[Requirement (3)]

In the copolymer (A) according to the present invention, the ratio ([C-1]/[C-2]) of the percent by mole of the structural units derived from the nonconjugated polyene [C-1], in which among carbon-carbon double bonds, only one carbon-carbon double bond polymerizable with the metallocene catalyst is present in one molecule, to the percent by mole of the structural units derived from the nonconjugated polyene [C-2], in which among the carbon-carbon double bonds, two carbon-carbon double bonds polymerizable with the metallocene catalyst are present in one molecule, is 75/25 to 99.5/0.5. Preferably, the above-described ratio of the percent by mole of the structural units derived from the component [C-1] to the percent by mole of the structural units derived from the component [C-2] is 78/22 to 97/3.

It is preferable that the above-described ratio of the percent by mole of the structural units derived from the component [C-1] to the percent by mole of the structural units derived from the component [C-2] is within the above-described range because an excellent balance between the vulcanization reactivity and the gas-retaining property during a foaming reaction and an excellent balance between the cross-linking activity and the amount of generation of foaming gas are achieved.

It has been hitherto required to use EPDM containing about 10 percent by weight of structural units derived from nonconjugated polyene [C-1], e.g., 5-ethylidene-2-norbornene (ENB), for producing a cross-linked foam, e.g., a sponge. However, in the present invention, a high-performance sponge can be produced by using the nonconjugated polyene [C-2], e.g., 5-vinyl-2-norbornene (VNB), at the above-described molar ratio relative to the nonconjugated polyene [C-1] even when the EPDM including merely about 5 percent by weight of structural units derived from nonconjugated polyene [C-1] is used. A reduction in the usage of the nonconjugated polyene [C-1], e.g., ENB, is effective in improving the heat aging resistance of the resulting cross-linked foam and reducing the production cost.

In this regard, the above-described molar ratio of the percent by mole of the structural units derived from the component [C-1] to the percent by mole of the structural units derived from the component [C-2] can be determined on the basis of $^{13}$C-NMR.

A copolymer, which is the copolymer (A) according to the present invention, produced from ethylene, propylene, 5-ethylidene-2-norbornene (ENB), and 5-vinyl-2-norbornene (VNB) will be taken as an example, and a method for determining the requirements (1) to (3) will be described below specifically.

In this regard, the structure (composition) analysis of the copolymer of ethylene, propylene, and ENB through the use of $^{13}$C-NMR was conducted on the basis of "Macromolecules", Vol. 10, p. 536-544 (1977) by C. J. Carman, R. A. Harrington, and C. E. Wilkes, "Macromolecules", Vol. 15, p. 1150-1152 (1982) by Masahiro Kakugo, Yukio Naito, Kooji Mizunuma, and Tatsuya Miyatake, and "Macromolecules", Vol. 16, p. 85-89 (1983) by G. Van der Velden. The structure analysis of the VNB-based copolymer was conducted on the basis of "Macromol. Rapid Commun.", Vol. 20, p. 356-360 (1999) by Harri Lasarov and Tuula T. Pakkanen and "Macromol. Rapid Commun.", Vol. 22, p. 434-438 (2001) by Harri Lasarov and Tuula T. Pakkanen.

Initially, the integral values of individual peaks derived from ethylene, propylene, ENB, and VNB were determined through the use of $^{13}$C-NMR.

1) ethylene; [integral of peak derived from ethylene chain]+[integral of peak derived from ethylene-propylene chain]/2
2) propylene; [integral of peak derived from propylene chain]+[integral of peak derived from ethylene-propylene chain]/2
3) ENB; integral of peak of ENB-position 3
4) VNB; integral of peak of VNB-position 7

Formulae of structures (E-isomer, Z-isomer) derived from ENB in the copolymer (A) according to the present invention and formulae of structures (endo (n), exo (x)) derived from VNB are described below.

[Chemical formula 2]

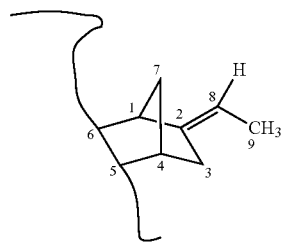
E-isomer

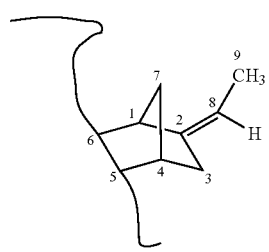
Z-isomer

[Chemical formula 3]

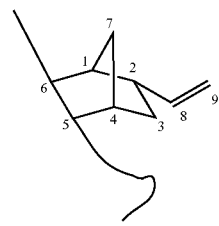
endo (n)

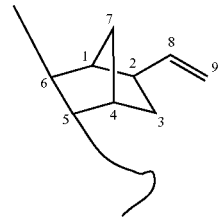
exo (x)

The percents by mole of the structural units derived from ENB and VNB were calculated from the resulting integrals. In this regard, conversion to percent by weight was conducted on the assumption that the molecular weight of ethylene was 28.05, the molecular weight of propylene was 42.08, and the molecular weights of ENB and VNB were 120.2.

[Requirement (4)]

In the copolymer (A) according to the present invention, an upper limit of the Mooney viscosity [ML (1+4) 100° C.] measured at 100° C. is 200, preferably 100, more preferably 90, particularly preferably 80, and most preferably 60. The lower limit is 10, and preferably 20. More specifically, the Mooney viscosity [ML (1+4) 100° C.] measured at 100° C. is 10 to 200, preferably 10 to 90, more preferably 10 to 80, and most preferably 20 to 60. In the case where the Mooney viscosity is within this range, a highly foamed member is produced and excellent kneading stability is exhibited.

It is preferable that the Mooney viscosity is within the above-described range because the viscosity of a rubber compound serving as a foaming medium can be set at a low level relatively easily and a formulation excellent in kneadability can be designed.

In this regard, the above-described Mooney viscosity can be measured by using a Mooney viscometer (Model SMV202 produced by SHIMADZU CORPORATION) in conformity with JIS K 6300.

[Requirement (5)]

The copolymer (A) according to the present invention satisfies the following formula (I), and preferably satisfies the following formula (I').

$$50 > \text{activation energy of fluidization } (Ea)[\text{kJ/mol}] > 35 \quad (I)$$

$$45 > \text{activation energy of fluidization } (Ea)[\text{kJ/mol}] > 37 \quad (I')$$

In the case where the activation energy of fluidization (Ea) of the copolymer (A) is 35 or less, it is difficult to obtain a highly foamed cross-linked formed member. Furthermore, the copolymer (A) having Ea of 50 or more gels, so that production of a cross-linked rubber and a cross-linked foam tends to become difficult substantially.

The activation energy of fluidization will be described below.

In general, the viscosity of a molten polymer decreases as the temperature rises in a manner similar to that in the case of a rheological simple liquid. For example, it is known that the temperature dependence of viscosity ($\eta_0$) follows an Arrhenius type equation represented by a formula (A) described below at a temperature 100° C. higher than the glass transition temperature (Tg).

$$\text{Viscosity } (\eta_0) = A \exp(Ea/RT) \tag{A}$$

R: gas constant, A: frequency factor, Ea: activation energy of fluidization, T: absolute temperature The above-described activation energy of fluidization is independent of the molecular weight and the molecular weight distribution and is influenced by only the molecular structure. Therefore, the activation energy of fluidization is assumed to be a useful indicator, which represents structural information of a polymer.

Regarding an olefin-based polymer produced by using a Ziegler catalyst, it is difficult to control the molecular structure accurately, so that the activation energy of fluidization including various types of structural information has been calculated. However, the metallocene catalyst has been discovered and, production technology has progressed and, thereby, the composition distribution, the molecular weight distribution, and even an extent of branching of short chain and an extent of branching of long chain can be controlled. Consequently, up to now, it has been made clear that the activation energy of fluidization of a high density polyethylene (HDPE) is about 27 kJ/mol and the activation energy of fluidization of low-density polyethylene (LDPE) is about 56 kJ/mol.

It has been reported that in EPDM produced by using the metallocene catalyst, copolymerized diene components are uniformly distributed in the molecular structure of the EPDM (Reference 3: B. A. Harrington and M. G. Williams, "American Chemical Society Rubber Division Technical Meeting", October 2003, p. 14-17). That is, it becomes possible to control the molecular structure of the EPDM accurately by using the metallocene catalyst and, at the same time, it becomes possible to level the cross-linking activity, so that the relationship between the activation energy of fluidization and the properties of the rubber composition, the cross-linked rubber, and the cross-linked foam can be grasped.

Incidentally, it is believed that a difference in activation energy of fluidization results from long chain branching, and analysis of long chain branching has been conducted by a nuclear magnetic resonance (NMR) method and a light scattering method. However, accurate results are not always obtained. Consequently, intensive research has been still conducted taking note of the rheological characteristics (Reference 1: "Seikei-Kakou", Vol. 20, No. 7, p. 400-404 (2008), by Masayuki Yamaguchi and Reference 2: "Macromolecular Chemistry and Physics", Vol. 208, p. 2449-2454 (2007), by F. J. Stadler, C. Gabriel, and H. Munstedt).

In general, in order to prepare a cross-linked foam by cross-linking foaming of a rubber composition including an ethylene.propylene.diene copolymer (EPDM), it is important to control the cross-linking reaction and the foaming reaction, as well as the properties of the rubber composition.

For example, if the viscosity of the rubber composition is too low, the foaming gas-retaining property becomes poor and, thereby, the specific gravity cannot be reduced so as to cause deterioration in appearance. Conversely, if the viscosity of the rubber composition is too high, foaming is not effected easily. Furthermore, network formation due to the cross-linking reaction of the EPDM is mentioned as one of the factors having an influence on the viscosity of the rubber composition, and it is also important to control the cross-linking reaction. That is, the viscosity of the rubber composition is also influenced by the cross-linking density of the EPDM and, therefore, it is also important to control the cross-linking reaction. In the present invention, a high-performance sponge can be produced by using the nonconjugated polyene [C-2], wherein a terminal vinyl group forms a branch structure, at the above-described molar ratio relative to the nonconjugated polyene [C-1] in the copolymer (A).

In the past, in order to improve the foaming gas-retaining property under the condition, in which the viscosity of the rubber composition is reduced, it has been investigated to improve the gas-retaining property by conducting a molecular design in such a way as to expand the molecular weight distribution of the EPDM and introducing a high molecular weight component. In this regard, it is well known that the gas-retaining property is improved by introducing a long chain branch into a polymer. However, regarding the conventional EPDM through the use of the Ziegler catalyst, the introduction in itself of the long chain branch is difficult. Moreover, as described above, the diene component is not distributed uniformly in the polymer, so that the cross-linking reaction is maldistributed and, as a result, it is difficult to obtain an adequately highly foamed member.

Then, in the present invention, the cross-linking activity is controlled by introducing the diene component uniformly into the polymer through the use of the metallocene catalyst in the production of the copolymer (A) and, in addition, long chain branches are introduced to a greater extent by copolymerizing the nonconjugated polyene [C-2], e.g., 5-vinyl-2-norbornene (VNB), having a terminal double bond, so that the structural characteristic thereof is specified by the activation energy of fluidization. That is, satisfaction of the above-described formula (I) by the activation energy of fluidization refers to that many long chain branches are included in the molecular structure of the copolymer (A) according to the present invention. The activation energy of fluidization being outside the range refers to that there is no long chain branch or there are not many long chain branches. In the case where a copolymer having activation energy of fluidization within the above-described range was used, a highly foamed cross-linked foam, which was not easily produced previously, was able to be prepared easily and stably. Furthermore, it was found that a rubber composition including the copolymer (A) according to the present invention exhibited excellent kneadability and excellent shape stability in preparation of a cross-linked foam.

The activation energy (Ea) of fluidization is a numerical value calculated by an Arrhenius type equation from the shift factor (aT) in formation of a master curve indicating the dependence of the melt complex viscosity (unit: Pa·sec) at 190° C. on the frequency (unit: rad/sec), on the basis of the temperature-time superposition principle.

A method for determining the activation energy (Ea) of fluidization is described below.

Regarding two temperatures of 170° C. and 210° C., the melt complex viscosity-frequency curve of the copolymer (A) at each temperature (T, unit: ° C.) is superposed on the melt complex viscosity-frequency curve of the copolymer (A) at 190° C. on the basis of the temperature-time superposition principle so as to determine the shift factor (aT). A linear approximate expression (I) of ln(aT) and 1/(T+273.16) is calculated by the method of least squares from each temperature (T) and the shift factor (aT) at the temperature (T). Subsequently, Ea is determined from the gradient m of the above-described linear expression (I) and the expression (II) described below.

$$\ln(aT) = m[1/(T+273.16)] + n \tag{I}$$

$$Ea = 0.008314 \times m \tag{II}$$

aT: shift factor
Ea: activation energy of fluidization (unit: kJ/mol)
T: temperature (unit: ° C.)
n: Y axis intercept The above-described calculation is conducted by using, for example, a commercially available calculation software (RSI Orchestrator VER. 6.6.3: produced by TA Instruments Japan Inc.).

In this regard, the shift factor (aT) is the amount of movement in the case where the curve of the melt complex viscosity-frequency (log-log) at each of temperatures of 170° C. and 210° C. is moved in a log(Y)=−log(X) axis direction (where the Y axis indicates the melt complex viscosity and the X axis indicates the frequency) and is superposed on the melt complex viscosity-frequency curve at 190° C. In the superposing, the log-log curve of the melt complex viscosity-frequency at each temperature (T) is moved in such a way that the frequency is multiplied by a factor of aT and the melt complex viscosity is multiplied by a factor of 1/aT.

In this connection, in determination of the linear approximate expression (I) obtained from the shift factors (aT) and the temperature by the method of least squares at three temperatures of 170° C., 190° C., and 210° C., the correlation coefficient is usually 0.99 or more.

The melt complex viscosity-frequency curve was obtained on the basis of measurement through the use of a viscoelasticity measuring apparatus described below. As for a test piece, the copolymer (A) was pressed at 190° C., the resulting sheet having a thickness of 2 mm was stamped into a disk shape having a diameter of 25 mm, and the resulting test piece was used. In this regard, the test piece may contain an appropriate amount (for example, about 1,000 ppm) of antioxidant.

Apparatus: viscoelasticity measuring apparatus RDS-2 (produced by Rheometric Scientific)
Measurement Condition
Geometry: parallel plate
Measurement temperature: 170° C., 190° C., and 210° C.
Frequency: 0.5 to 79.577 Hz
Distortion factor: 1.0%

The frequency dependence of the viscosity was measured under the above-described condition, and the activation energy of fluidization was calculated by the above-described Arrhenius type equation.

As for a data processing software, RSI Orchestrator VER. 6.6.3 (produced by TA Instruments Japan Inc.) was used.

In this regard, the copolymer having the above-described specific activation energy (Ea) of fluidization can be obtained by adjusting the apparent iodine value described later.

Moreover, it is preferable that the copolymer (A) according to the present invention further has the following features besides the above-described requirements (1) to (5).

It is preferable that in the copolymer (A) according to the present invention, the apparent iodine value (IV) of the structural units derived from the above-described nonconjugated polyene [C-2], in which among the carbon-carbon double bonds, two carbon-carbon double bonds polymerizable with the metallocene catalyst are present in one molecule, is 0.1 to 3.0 g/100 g.

The upper limit of the apparent iodine value of the above-described component [C-2] is preferably 3.0, and more preferably 2.0. The lower limit is preferably 0.1, more preferably 0.2, particularly preferably 0.4, and most preferably 0.5. Further specifically, the apparent iodine value of the component [C-2] is more preferably 0.4 to 3.0 g/100 g, and particularly preferably 0.5 to 3.0 g/100 g. The copolymer (A) having activation energy of fluidization satisfying the requirement (5) can be obtained by adjusting the iodine value.

It is preferable that the apparent iodine value of the above-described component [C-2] is within the above-described range because excellent foamability and excellent kneading stability are exhibited.

In this regard, the apparent iodine value of the above-described component [C-2] can be determined on the basis of $^1$H-NMR and $^{13}$C-NMR.

A method for determining the apparent iodine value of the structural units derived from ethylene.propylene.5-ethylidene-2-norbornene (ENB).5-vinyl-2-norbornene (VNB) quatercopolymer, which is an example of the copolymer (A) according to the present invention, will be described below.

Initially, the integral of the structural units derived from each of ethylene, propylene, ENB (peak of position 3), and VNB (peak of position 7) in the copolymer was determined on the basis of the $^{13}$C-NMR spectrum. The molar ratios of structural units derived from ENB and VNB are calculated from the ratios of the resulting integrals, and the percent by weight of ENB was determined on the basis of the molecular weights of ethylene, propylene, ENB, and VNB.

Subsequently, the integral of the peak (a) derived from ENB and the peak (c) derived from the vinyl group of VNB were determined on the basis of the $^1$H-NMR spectrum, as described below.

1) Integral of peak (a) derived from ENB: [total of integrals of a plurality of peaks in the vicinity of 4.7 to 5.3 ppm]−[2× integral of peak (c)]

The plurality of peaks in the vicinity of 4.7 to 5.3 ppm includes both peak (a) and peak (b). In the present invention, in order to determine the integral of the peak (a), the integral of the peak (b) derived from two equivalent protons is assumed to be twice the integral of the peak (c) derived from one proton and is subtracted from the integrals of the plurality of peaks in the vicinity of 4.7 to 5.3 ppm.

2) Integral of peak (c) derived from vinyl group of VNB: total of integrals of peaks in the vicinity of 5.5 to 6.0 ppm In this regard, the peaks (a) to (c) of the items 1) and 2) indicate (a), (b), and (c), respectively, in the following formulae (X) and (Y).

[Chemical formula 4]

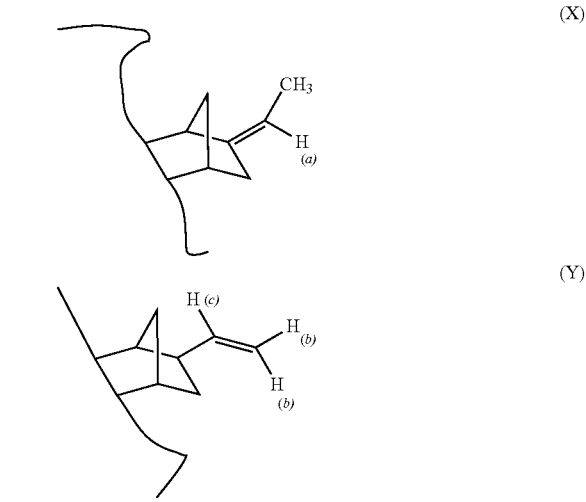

The apparent iodine value of the structural units derived from VNB (molecular weight 120.2) was calculated by using the resulting integrals on the basis of the following formula.

Apparent iodine value of structural units derived from VNB: [integral of peak (c) derived from vinyl group of VNB]/[integral of peak (a) derived from ENB]×[percent by weight of ENB determined on the basis of $^{13}$C-NMR spectrum]× 253.81/120.2

In this regard, the molecular weight of iodine ($I_2$) is 253.81.

As described above, the copolymer (A) according to the present invention is a copolymer synthesized through the use of the metallocene catalyst. As for the metallocene catalyst, a catalyst represented by the following formula (I), (II), or (III) is preferable.

The compounds represented by the formula (I) will be described.

[Chemical formula 5]

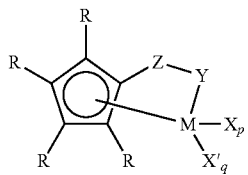

(I)

In the formula (I), each R represents independently a group selected from hydrocarbyl, halohydrocarbyl, silyl, germyl, and combinations thereof or a hydrogen atom, and the number of atoms included in the group is 20 or less excluding hydrogen.

The letter M represents titanium, zirconium, or hafnium.

The letter Y represents —O—, —S—, —NR*—, or —PR*—.

The letter R* represents a hydrogen atom, a hydrocarbyl group, a hydrocarbyloxy group, a silyl group, a halogenated alkyl group, or a halogenated aryl group, and in the case where R* is not hydrogen, R* includes 20 or less of atoms excluding hydrogen.

The letter Z represents a divalent group including boron or a group 14 element and, in addition, containing nitrogen, phosphorus, sulfur, or oxygen, and the number of atoms included in the divalent group is 60 or less excluding hydrogen.

In the case where a plurality of X is present, each X represents independently an anionic ligand having the number of atoms of 60 or less (where a cyclic ligand, in which n electrons are delocalized, is excluded.).

In the case where a plurality of X' is present, each X' represents independently a neutral linked compound having the number of atoms of 20 or less.

The letter p represents 0, 1, or 2.

The letter q represents 0 or 1.

However, in the case where p is 2 and q is 0, M is in an oxidized state of +4, X is an anionic ligand selected from the group consisting of halides, hydrocarbyl, hydrocarbyloxy, a di(hydrocarbyl)amide, a di(hydrocarbyl)phosphide, a hydrocarbyl sulfide, a silyl group, halo-substituted derivatives thereof, di(hydrocarbyl)amino-substituted derivatives thereof, hydrocarbyloxy-substituted derivatives thereof, and di(hydrocarbyl)phosphine-substituted derivatives thereof, and the number of atoms of X is 20 or less excluding hydrogen. Furthermore, in the case where p is 1 and q is 0, M is in an oxidized state of +3 and X is an anionic stabilizing ligand selected from the group consisting of allyl, 2-(N,N'-dimethylaminomethyl)phenyl, and 2-(N,N'-dimethyl)aminobenzyl or M is in an oxidized state of +4, and X is a divalent conjugated diene derivative and forms metallacyclopentene with M. Alternatively, in the case where p is 0 and q is 1, M is in an oxidized state of +2, and X' is a neutral conjugated or non-conjugated diene, which may be substituted with at least one hydrocarbyl group, which has the number of carbon atoms of 40 or less, and which forms a π complex with M.

The compounds represented by the formula (II) will be described.

[Chemical formula 6]

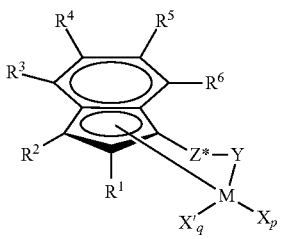

(II)

In the formula (II), $R^1$ and $R^2$ represent independently a hydrogen atom or an alkyl group having 1 to 6 carbon atoms, and at least one of $R^1$ and $R^2$ is not a hydrogen atom.

The Letters $R^3$ to $R^6$ represent independently a hydrogen atom or an alkyl group having 1 to 6 carbon atoms.

In this regard, $R^1$ to $R^6$ may be bonded to each other so as to form a ring.

The letter M represents titanium.

The letter Y represents —O—, —S—, —NR*— or —PR*—.

The letter Z* represents $SiR^*_2$, $CR^*_2$, $SiR^*_2SiR^*_2$, $CR^*_2CR^*_2$, $CR^*{=}CR^*$, $CR^*_2SiR^*_2$, or $GeR^*_2$.

Each letter R* represents independently a hydrogen atom, a hydrocarbyl group, a hydrocarbyloxy group, a silyl group, a halogenated alkyl group, or a halogenated aryl group, and in the case where R* is not hydrogen, R* includes 20 or less of atoms excluding hydrogen. Two R*s (in the case where R* is not hydrogen) bonded to Z* may form a ring, or R* bonded to Z* and R* bonded to Y may form a ring.

The letter p represents 0, 1, or 2.

The letter q represents 0 or 1.

However, in the case where p takes on 2, q is 0, M is in an oxidized state of +4, each X represents independently a methyl group or a benzyl group. Alternatively, in the case where p takes on 1, q is 0, M is in an oxidized state of +3, and X is a 2-(N,N'-dimethyl)aminobenzyl group or q is 0, M is in an oxidized state of +4, and X is 1,3-butadienyl. Alternatively, in the case where p takes on 0, q is 1, M is in an oxidized state of +2, and X' is 1,4-diphenyl-1,3-butadiene, 2,4-hexadiene, or 1,3-pentadiene.

The compounds represented by the formula (III) will be described.

[Chemical formula 7]

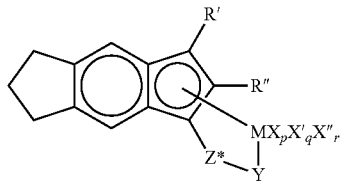

(III)

In the formula (III), R' represents a hydrogen atom, a hydrocarbyl group, a di(hydrocarbylamino) group, or a hydrocarbyleneamino group, and in the case where R' described above has carbon atoms, the number of carbon atoms is 20 or less.

In the formula (III), R" represents a hydrocarbyl group having 1 to 20 carbon atoms or a hydrogen atom.

In the formula (III), M represents titanium.

In the formula (III), Y represents —O—, —S—, —NR*—, —PR*—, —NR*$_2$, or —PR*$_2$.

In the formula (III), Z* represents —SiR*$_2$—, —CR*$_2$—, —SiR*$_2$SiR*$_2$—, —CR*$_2$CR*$_2$—, —CR*=CR*—, —CR*$_2$SiR*$_2$—, or —GeR*$_2$—.

In the case where a plurality of R* described above is present, each R* represents independently a hydrogen atom or a group containing at least one group selected from the group consisting of hydrocarbyl, hydrocarbyloxy, silyl, halogenated alkyl, and halogenated aryl, R* described above includes an atom of the atomic number of 2 to 20, and two R*s (in the case where R* is not a hydrogen atom) optionally included in Z* may form a ring, or R* of Z* and R* of Y may form a ring.

In the formula (III), the letter X represents a monovalent anionic ligand having the number of atoms of 60 or less excluding cyclic ligands, in which π electrons are delocalized. The letter X' represents a neutral linked group having the number of atoms of 20 or less. The letter X" represents a divalent anionic ligand having the number of atoms of 60 or less. The letter p represents 0, 1, or 2. The letter q represents 0 or 1. The letter r represents 0 or 1.

In the case where p takes on 2, q and r are 0, M is in an oxidized state of +4 (where the case, in which Y is —NR*$_2$ or —PR*$_2$, is excluded) or M is in an oxidized state of +3 (where Y is —NR*$_2$ or —PR*$_2$), and X is an anionic ligand selected from the group consisting of a halide group, a hydrocarbyl group, a hydrocarbyloxy group, a di(hydrocarbyl)amide group, a di(hydrocarbyl)phosphide group, a hydrocarbyl sulfide group, a silyl group, halogen-substituted groups of these groups, di(hydrocarbyl)amino-substituted groups of these groups, hydrocarbyloxy-substituted groups of these groups, and di(hydrocarbyl)phosphino-substituted groups of these groups while the above-described groups include atoms of the atomic number of 2 to 30.

In the case where r takes on 1, p and q are 0, M is in an oxidized state of +4, X" is a dianionic ligand selected from the group consisting of a hydrocarbazyl group, an oxyhydrocarbyl group, and a hydrocarbylenedioxy group, and X" described above includes atoms of the atomic number of 2 to 30. In the case where p takes on 1, q and r are 0, M is in an oxidized state of +3, and X is an anionic stabilizing ligand selected from the group consisting of allyl, 2-(N,N-dimethylamino)phenyl, 2-(N,N-dimethylaminomethyl)phenyl, and 2-(N,N-dimethylamino)benzyl. In the case where p and r take on 0, q is 1, M is in an oxidized state of +2, X' is a neutral conjugated diene or a neutral diconjugated diene substituted with at least one hydrocarbyl group optionally, and X" described above has the number of carbon atoms of 40 or less and forms a bond with M through π-π interaction.

As for more preferable embodiments, in the case where p takes on 2 and q and r take on 0 in the formula (III), M is in an oxidized state of +4, and each of X is independently methyl, benzyl, or halide. In the case where p and q take on 0, r is 1, M is in an oxidized state of +4, and X" is a 1,4-butadienyl group, which forms a metallacyclopentene ring with M. In the case where p takes on 1, q and r are 0, M is in an oxidized state of +3, and X is 2-(N,N-dimethylamino)benzyl. In the case where p and r take on 0, q is 1, M is in an oxidized state of +2, and X' is 1,4-diphenyl-1,3-butadiene or 1,3-pentadiene.

The compounds represented by the following formula (III') among the formula (III) are particularly preferable.

[Chemical formula 8]

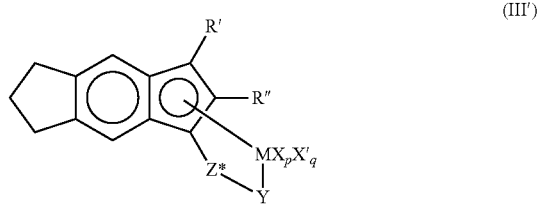

(III')

In the above-described formula (III'), R' represents a hydrogen atom or a hydrocarbyl group having 1 to 20 carbon atoms, R" represents a hydrocarbyl group having 1 to 20 carbon atoms or a hydrogen atom, M represents titanium, Y represents —NR*—, Z* represents —SiR*$_2$—, each R* described above represents independently a hydrogen atom or a hydrocarbyl group having 1 to 20 carbon atoms, one of p and q is 0 and the other is 1. In the case where p takes on 0 and q takes on 1, M is in an oxidized state of +2 and X' is 1,4-diphenyl-1,3-butadiene or 1,3-pentadiene. In the case where p takes on 1 and p takes on 0, M is in an oxidized state of +3, and X is 2-(N,N-dimethylamino)benzyl.

Examples of hydrocarbyl groups having 1 to 20 carbon atoms include linear alkyl groups, e.g., methyl group, ethyl group, and butyl group, and branched alkyl groups, e.g., t-butyl group and neopentyl group. Examples of hydrocarbyloxy groups include linear alkyloxy groups, e.g., methyloxy group, ethyloxy group, and butyloxy group, and branched alkyloxy groups, e.g., t-butyloxy group and neopentyloxy group. Examples of halogenated alkyl groups include groups produced by chlorinating, brominating, or fluorinating the above-described linear or branched alkyl groups. Alternatively, examples of halogenated aryl groups include chlorophenyl group and chloronaphthyl group.

In the above-described formula (III'), it is preferable that R' is a hydrogen atom or methyl and the case of a hydrogen atom is particularly preferable. Furthermore, it is preferable that R" is a hydrogen atom or methyl and the case of methyl is particularly preferable.

Among the compounds represented by the above-described formula (I), formula (II), or formula (III), specific examples of particularly preferable embodiments include (t-butylamide)dimethyl(η$^5$-2-methyl-s-indacen-1-yl)silane-titanium(II)2,4-hexadiene (compound represented by a formula (IV)), (t-butylamide)dimethyl(η$^5$-2-methyl-s-indacen-1-yl)silane-titanium(IV)dimethyl (compound represented by a formula (V)), (t-butylamide)dimethyl(η$^5$-2,3-dimethylindenyl)silane-titanium(II)1,4-diphenyl-1,3-butadiene (compound represented by a formula (VI)), (t-butylamide)dimethyl($\eta^5$-2,3-dimethyl-s-indacen-1-yl)silane-titanium(IV) dimethyl (compound represented by a formula (VII)), (t-butylamide)dimethyl($\eta^5$-2-methyl-s-indacen-1-yl)silane-titanium(II)1,3-pentadiene (compound represented by a formula (VIII)), and (t-butylamide)dimethyl(tetramethyl-$\eta^5$-cyclopentadienyl)silane-titanium(1,3-pentadiene) (compound represented by a formula (IX)).

Among them, (t-butylamide)dimethyl($\eta^5$-2-methyl-s-indacen-1-yl)silane-titanium(II)1,3-pentadiene (compound represented by a formula (VIII)) is particularly preferable.

[Chemical formula 9]

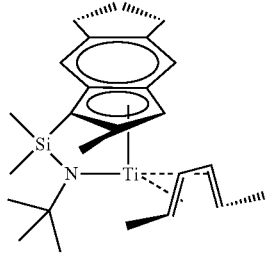

(IV)

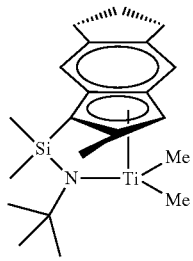

(V)

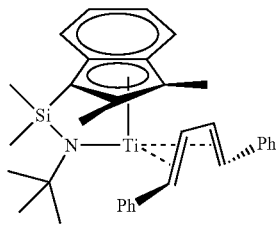

(VI)

[Chemical formula 10]

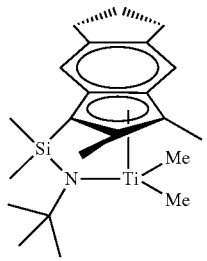

(VII)

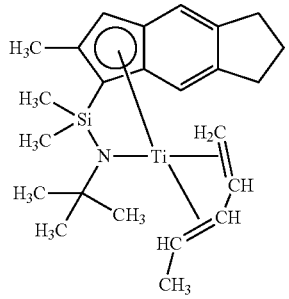

(VIII)

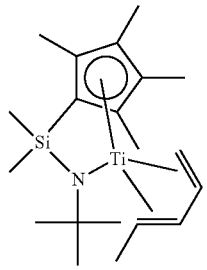

(IX)

In the case where the compound represented by the above-described formula (I), formula (II), or formula (III), preferably the compound represented by the formula (III'), and particularly preferably the compound represented by the above-described formula (VIII) is used, regarding the polymerization reaction to produce the copolymer (A) according to the present invention, excellent copolymerizability of nonconjugated polyene (component [C-1] and component [C-2]), in particular polymerizability of the double bond at a terminal of the nonconjugated polyene [C-2], is exhibited. For example, the double bond at a VNB terminal is taken in efficiently and long chain branches can be introduced at a high proportion. Furthermore, the molecular weight distribution and the composition distribution of the resulting copolymer (A) are narrow and the copolymer having a very uniform molecular structure can be prepared. Therefore, formation of gel-like blobs, which is feared along with generation of long chain branches, on a surface of a rubber formed member is suppressed significantly. As a result, rubber formed members, e.g., cross-linked rubber and cross-linked foam, produced including the above-described copolymer (A) does not contain the gel-like blob. Consequently, excellent appearance of the surface thereof is exhibited, and a shape-retaining property is excellent, so that good production stability is exhibited.

These catalysts can be prepared by using a known synthesis method, such as a method disclosed in WO 98/49212.

Method for Manufacturing Copolymer (A)

The copolymer (A) according to the present invention can be synthesized by a continuous method or a batch method, wherein the above-described metallocene catalyst is used as a main catalyst, a boron compound and/or an organic aluminum compound, e.g., a trialkylaluminum, is used as a cocatalyst, an aliphatic hydrocarbon, e.g., hexane, is served as a solvent, and a reactor with an agitator is used.

Examples of boron compounds include trimethylammonium tetrakis(pentafluorophenyl)borate, di(hydrogenated-tallowalkyl)methylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(s-butyl)ammonium tetrakis(pentafluorophenyl)

borate, N,N-dimethylanilinium tetrakis(pentafluorophenyl) borate, N,N-dimethylanilinium n-butyltris (pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris (pentafluorophenyl)borate, N,N-diethylanilinium tetrakis (pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3, 4,6-tetrafluorophenyl)borate, and N,N-dimethyl-2,4,6-trimethylanilinium tetrakis(2,3,4,6-tetrafluorophenyl)borate; dialkylammonium salts, e.g., di(isopropyl)ammonium tetrakis(pentafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, and dicyclohexylammonium tetrakis(pentafluorophenyl)borate; trisubstituted phosphonium salts, e.g., triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; disubstituted oxonium salts, e.g., diphenyloxonium tetrakis (pentafluorophenyl)borate, di(o-tolyl)oxonium tetrakis(pentafluorophenyl)borate, and di(2,6-dimethylphenyl)oxonium tetrakis(pentafluorophenyl)borate; and disubstituted sulfonium salts, e.g., diphenylsulfonium tetrakis(pentafluorophenyl)borate, di(o-tolyl)sulfonium tetrakis(pentafluorophenyl) borate, and bis(2,6-dimethylphenyl)sulfonium tetrakis (pentafluorophenyl)borate.

As for the organic aluminum compound, triisobutylaluminum (TIBA) is mentioned.

The reaction temperature can be raised to 100° C. because the catalyst is not deactivated even at high temperatures. The polymerization pressure is usually within the range of more than 0 MPa, and 8 MPa or less (gauge pressure), and preferably more than 0 MPa, and 5 MPa or less (gauge pressure). The reaction temperature (an average residence time in the case where copolymerization is conducted by a continuous method) is different depending on the condition, e.g., a catalyst concentration and a polymerization temperature, and is usually 0.5 minute to 5 hours, and preferably 10 minutes to 3 hours. Furthermore, a molecular weight modifier, e.g., hydrogen, can be used.

The molar ratio (charge ratio) ([A]/[B]) of ethylene [A] to α-olefin [B] is usually 25/75 to 80/20, and preferably 30/70 to 70/30.

The molar ratio (charge ratio) ([C-1]/[C-2]) of the nonconjugated polyene [C-1] to the nonconjugated polyene [C-2] is usually 60/40 to 99.5/0.5, and preferably 65/35 to 99/1.

The molar ratio (charge ratio) ([A]/[C-1]) of ethylene [A] to the nonconjugated polyene [C-1] is usually 70/30 to 99/1, and preferably 80/20 to 98/2.

The molar ratio (charge ratio) ([A]/[C-2]) of ethylene [A] to the nonconjugated polyene [C-2] is usually 70/30 to 99.9/0.1, and preferably 80/20 to 99.5/0.5.

It is preferable that the polymerization is conducted by using the above-described catalyst because the nonconjugated polyene and the like having a double bond is copolymerized at a high degree of conversion and an appropriate amount of long chain branches can be introduced in the resulting copolymer [A].

In the thus obtained copolymer [A] according to the present invention, the structural units derived from the α-olefin [B] having 3 to 20 carbon atoms constitute 10 to 50 percent by mole, and preferably 25 to 45 percent by mole in 100 percent by mole of the total structural units. Moreover, the total of the percent by mole of the structural units derived from the nonconjugated polyene [C-1], in which among carbon-carbon double bonds, only one carbon-carbon double bond polymerizable with the metallocene catalyst is present in one molecule, and the percent by mole of the structural units derived from the nonconjugated polyene [C-2], in which among the carbon-carbon double bonds, two carbon-carbon double bonds polymerizable with the metallocene catalyst are present in one molecule, is 1.0 to 6.0 percent by mole, and preferably 1.0 to 5.0 percent by mole. The ratio ([C-1]/[C-2]) of the percent by mole of the structural units derived from the nonconjugated polyene [C-1], in which among carbon-carbon double bonds, only one carbon-carbon double bond polymerizable with the metallocene catalyst is present in one molecule, to the percent by mole of the structural units derived from the nonconjugated polyene [C-2], in which among the carbon-carbon double bonds, two carbon-carbon double bonds polymerizable with the metallocene catalyst are present in one molecule, is 75/25 to 99.5/0.5, and preferably 78/22 to 97/3.

It is preferable that the polymerization is conducted by using the above-described catalyst because the nonconjugated polyene and the like having a double bond is copolymerized at a high degree of conversion and an appropriate amount of long chain branches can be introduced in the resulting copolymer [A].

[Rubber Composition]

The rubber composition according to the present invention is characterized by including the above-described copolymer [A].

The rubber composition according to the present invention is characterized by including the above-described copolymer (A) and at least one type of ethylene-based polymer (B) selected from the group consisting of an ethylene.α-olefin having 3 to 20 carbon atoms.nonconjugated polyene copolymer (excluding the copolymer (A)) (B1), an ethylene.α-olefin copolymer (B2), and an ethylene.polar monomer copolymer (B3).

[Ethylene-Based Polymer (B)]

The ethylene-based polymer (B) used in the present invention is characterized by being at least one type of polymer selected from the group consisting of an ethylene.α-olefin having 3 to 20 carbon atoms.nonconjugated polyene copolymer (excluding the copolymer (A)) (B1), an ethylene.α-olefin copolymer (B2), and an ethylene.polar monomer copolymer (B3).

Ethylene.α-Olefin Having 3 to 20 Carbon Atoms.Nonconjugated Polyene Copolymer (B1)

The ethylene.α-olefin having 3 to 20 carbon atoms.nonconjugated polyene copolymer (B1) (hereafter may be referred to as "copolymer (B1)" simply) is an ethylene.α-olefin having 3 to 20 carbon atoms.nonconjugated polyene copolymer other than the above-described copolymer [A].

In the above-described copolymer (B1), usually 10 to 50 percent by mole, and preferably 20 to 40 percent by mole of structural units derived from the α-olefin having 3 to 20 carbon atoms are included in 100 percent by mole of the total structural units.

It is preferable that the structural units derived from the α-olefin having 3 to 20 carbon atoms is within the above-described range because the rubber elasticity after cross-linking is excellent.

As for the α-olefin having 3 to 20 carbon atoms, the same α-olefins as those described above in the explanation of the copolymer [A] are mentioned.

In the above-described copolymer (B1), the amount of structural units derived from the nonconjugated polyene is usually 0.5 to 5 percent by mole, and preferably 1 to 3 percent by mole in 100 percent by mole of the total structural units.

It is preferable that the structural units derived from the nonconjugated polyene is within the above-described range because the balance between the cross-linking and the foaming is excellent.

Examples of nonconjugated polyenes include 1,4-hexadiene, dicyclopentadiene, and 5-ethylidene-2-norbornene. Among them, 5-ethylidene-2-norbornene is preferable.

Specific examples of the above-described copolymer (B1) include ethylene.propylene.5-ethylidene-2-norbornene copolymer, ethylene.propylene.1,4-hexadiene copolymer, and ethylene.propylene.dicyclopentadiene copolymer.

The above-described copolymer (B1) may be produced by a previously publicly known method or a commercially available product may be used. Examples of commercially available products include Mitsui EPT 3090EM (trade name; produced by Mitsui Chemicals, Inc.), Mitsui EPT 3092M (trade name; produced by Mitsui Chemicals, Inc.), Nordel IP4640 (trade name; produced by Dow Chemical Company), Vistalon 7500 (trade name; produced by ExxonMobil Chemical Corporation), and Vistalon V8600 (trade name; produced by ExxonMobil Chemical Corporation).

The activation energy of fluidization (Ea) of the above-described copolymer (B1) is usually 5 to 35 kJ/mol. In the case where the activation energy of fluidization (Ea) is within the above-described range, long chain branches are reduced in the molecule structure of the copolymer (B1), and the strength characteristic becomes excellent.

In order to allow the activation energy of fluidization (Ea) to become within the above-described range, it is mentioned that, for example, in production of the copolymer (B1), the usage of a diene component, which is a nonconjugated polyene, having a terminal double bond is limited so as to reduce the amount of long chain branches in the molecule structure of the copolymer (B1) or the polymerization temperature is not specified to be too high.

The method for measuring the activation energy of fluidization (Ea) and the like are as described above in the explanation of the copolymer [A].

Ethylene.α-Olefin Copolymer (B2)

The ethylene.α-olefin copolymer (B2) used in the present invention is an amorphous or low-crystalline, random or block copolymer produced from ethylene and the α-olefin having 3 to 20 carbon atoms.

The density (ASTM D1505) of the ethylene.α-olefin copolymer (B2) is usually 0.857 to 0.910 g/cm³, and preferably 0.860 to 0.905 g/cm³.

The melt flow rate (MFR; ASTM D1238) of the ethylene.α-olefin copolymer (B2) at 190° C. and a load of 2.16 kg is usually 0.1 to 40 g/10 min, and preferably 0.5 to 20 g/10 min.

Examples of α-olefins constituting the ethylene-α-olefin copolymer (B2) include α-olefins having 3 to 20 carbon atoms, e.g., propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, and 4-methyl-1-pentene. Among them, α-olefins having 3 to 10 carbon atoms are preferable, and in particular propylene, 1-butene, 1-hexene, and 1-octene are preferable. One type of these α-olefins may be used alone or at least two types may be used in combination.

Furthermore, in the ethylene.α-olefin copolymer (B2), usually 75 to 95 percent by mole, and preferably 80 to 95 percent by mole of structural units derived from ethylene are included and usually 5 to 25 percent by mole, and preferably 5 to 20 percent by mole of structural units derived from the α-olefin having 3 to 20 carbon atoms are included. In this regard, the total of the structural units derived from ethylene and the structural units derived from the α-olefin having 3 to 20 carbon atoms is assumed to be 100 percent by mole.

The ethylene.α-olefin copolymer (B2) may include structural units derived from other polymerizable monomers, besides the above-described structural units, within the bounds of not impairing the effects of the present invention.

Specific examples of the ethylene.α-olefin copolymer (B2) include ethylene.propylene copolymer, ethylene.1-butene copolymer, ethylene.propylene.1-butene copolymer, ethylene.1-hexene copolymer, and ethylene.1-octene copolymer. Among them, ethylene.propylene copolymer, ethylene.1-butene copolymer, ethylene.1-hexene copolymer, ethylene.1-octene copolymer, and the like are preferable, and ethylene.1-butene copolymer is particularly preferable. These copolymers are usually random or block copolymers, and random copolymers are preferable.

The crystallinity of the ethylene.α-olefin copolymer (B2) measured by an X-ray diffraction method is usually 40% or less, and preferably 10% to 30%.

The melting point (Tm) of the ethylene.α-olefin copolymer (B2) measured with a differential scanning calorimeter (DSC) is usually 110° C. or lower, and preferably 105° C. or lower, although a melting point is not observed in some cases. The DSC measurement is conducted by putting about 10 mg of sample into an aluminum pan, (i) raising the temperature to 200° C. at 100° C./min, followed by keeping for 5 minutes, (ii) lowering the temperature to −150° C. at 10° C./min and, subsequently, (iii) raising the temperature to 200° C. at 10° C./min. The temperature of an endothermic peak observed in the process of raising the temperature described in the item (iii) is assumed to be the melting point (Tm).

The molecular weight distribution (Mw/Mn) of the ethylene.α-olefin copolymer (B2) determined through gel permeation chromatography (GPC) is usually 1.5 to 3.0, preferably 1.7 to 2.5. In the case where the molecular weight distribution (Mw/Mn) is within the above-described range, the resulting cross-linked foam has properties of an elastomer and is excellent in compression set property and shaping property.

The ratio (Tαβ/Tαα) of peak intensity of methylene groups (Tαβ and Tαα) in the structural units derived from the α-olefin having 3 or more carbon atoms, obtained from the $^{13}$C-NMR spectrum of the ethylene.α-olefin copolymer (B2) is usually 0.5 or less, and preferably 0.4 or less. Here, Tαβ and Tαα indicate methylene groups bonded to tertiary carbons, as described below.

[Chemical formula 11]

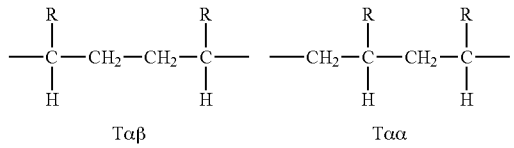

The Tαβ/Tαα can be determined as described below. That is, the $^{13}$C-NMR spectrum of the ethylene.α-olefin copolymer (B2) is measured by using, for example, an NMR measuring apparatus JEOL-GX270 (produced by JEOL LTD.).

The measurement is conducted by using a mixed solution of hexachlorobutadiene/benzene-$d_6$=2/1 (volume ratio) prepared in such a way that the sample concentration becomes 5 percent by mass, at a frequency of 67.8 MHz and a measurement temperature of 25° C. with reference to benzene-$d_6$ (128 ppm). The measured $^{13}$C-NMR spectrum is analyzed on the basis of the proposal of Lindeman.Adams ("Analytical Chemistry", Vol. 43, p. 1245 (1971)) and the report by J. C. Randall ("Reviews in Macromolecular Chemistry and Physics", C29, p. 201 (1989)), so as to determine the intensity ratio Tαβ/Tαα.

Furthermore, the B value determined from the $^{13}$C-NMR spectrum of the ethylene.α-olefin copolymer (B2) and the following formula is usually 0.9 to 1.5, and preferably 0.95 to 1.2.

$$B \text{ value}=[POE]/(2 \cdot [PE][PO])$$

(In the formula, [PE] represents a mole fraction of the structural units, which are derived from ethylene, contained in the copolymer (B2), [PO] represents a mole fraction of the structural units, which are derived from the α-olefin, contained in the copolymer (B2), and [POE] represents a proportion of the number of ethylene.α-olefin chains relative to the total dyad (dyad) chains in the copolymer (B2).)

This B value is an indicator representing the distribution state of the ethylene and the α-olefin having 3 to 20 carbon atoms in the ethylene.α-olefin copolymer (B2) and can be determined on the basis of the reports by J. C. Randall ("Macromolecules", Vol. 15, p. 353 (1982)) and by J. Ray ("Macromolecules", Vol. 10, p. 773 (1977)), for example.

The B value is usually determined by measuring the $^{13}$C-NMR spectrum of a sample, in which about 200 mg of ethylene-α-olefin copolymer (B2) is homogeneously dissolved into 1 ml of hexachlorobutadiene in a sample tube of 10 mm diameter, under the condition of a measurement temperature of 120° C., a frequency of 25.05 MHz, a spectrum width of 1,500 Hz, a pulse repetition time of 4.2 sec, and a pulse width of 6 μsec.

A large B value indicates that a block chain of the ethylene.α-olefin copolymer (B2) is short, the ethylene and the α-olefin are distributed uniformly, and the composition distribution of the copolymer (B2) is narrow. In this regard, if the B value becomes less than 1.0, the composition distribution of the ethylene.α-olefin copolymer (B2) becomes wide, and the handleability may become poor.

The above-described ethylene.α-olefin copolymer (B2) can be produced by a previously publicly known method through the use of a vanadium-based catalyst, a titanium-based catalyst, a metallocene-based catalyst, or the like. In particular, it is preferable that a solution polymerization method described in JP-A-S62-121709 and the like is used.

Ethylene.Polar Monomer Copolymer (B3)

Examples of polar monomers constituting the ethylene.polar monomer copolymer (B3) used in the present invention include unsaturated carboxylic acids, salts thereof, esters thereof (for example, vinyl esters), amides thereof, carbon monoxide, and sulfur dioxide. Specific examples include unsaturated carboxylic acids, e.g., acrylic acid, methacrylic acid, fumaric acid, itaconic acid, maleic anhydride, and itaconic anhydride; lithium, sodium, potassium, and other monovalent metal salts and magnesium, calcium, zinc, and other polyvalent metal salts of the unsaturated carboxylic acids; unsaturated carboxylic acid esters, e.g., methyl acrylate, ethyl acrylate, isopropyl acrylate, isobutyl acrylate, n-butyl acrylate, isooctyl acrylate, methyl methacrylate, ethyl methacrylate, isobutyl methacrylate, monomethyl maleate, dimethyl maleate, and monoethyl maleate; vinyl esters, e.g., vinyl acetate and vinyl propionate; carbon monoxide; and sulfur dioxide.

Among them, ethylene.unsaturated carboxylic acid copolymers, e.g., ethylene.acrylic acid copolymer and ethylene.methacrylic acid copolymer, and ionomers produced by neutralizing all or a part of carboxylic groups of the ethylene-.unsaturated carboxylic acid copolymers with the above-described metals; ethylene.unsaturated carboxylic acid ester copolymers, e.g., ethylene.methyl acrylate copolymer, ethylene.ethyl acrylate copolymer, ethylene.methyl methacrylate copolymer, ethylene.isobutyl acrylate copolymer, and ethylene.n-butyl acrylate copolymer; ethylene.unsaturated carboxylic acid ester.unsaturated carboxylic acid copolymers, e.g., ethylene.isobutyl acrylate.methacrylic acid copolymer and ethylene.n-butyl acrylate.methacrylic acid copolymer and ionomers produced by neutralizing all or a part of carboxylic groups of the ethylene.unsaturated carboxylic acid ester.unsaturated carboxylic acid copolymers with the above-described metals; ethylene.vinyl ester copolymers, e.g., ethylene.vinyl acetate copolymer; and the like are more preferable. Copolymers of ethylene and a polar monomer selected from unsaturated carboxylic acids, salts thereof, esters thereof, and vinyl acetate are further preferable. Ethylene.(meth)acrylic acid copolymer or ionomers thereof, ethylene.(meth)acrylic acid.(meth)acrylic acid ester copolymer or ionomers thereof, and ethylene.vinyl acetate copolymer are particularly preferable, and ethylene.vinyl acetate copolymer is most preferable.

The content of the polar monomer constituting the ethylene.polar monomer copolymer (B3) is usually 1 to 50 percent by mass, and preferably 5 to 45 percent by mass, although depending on the type of the polar monomer.

The melt flow rate (MFR) of the ethylene.polar monomer copolymer at 190° C. and a load of 2160 g is usually 0.05 to 500 g/10 min, and preferably 0.1 to 100 g/10 min from the viewpoint of the formability, the mechanical strength, and the like.

The ethylene.polar monomer copolymer (B3) can be produced by a previously publicly known method. Specifically, copolymers of ethylene and unsaturated carboxylic acids, unsaturated carboxylic acid esters, vinyl esters, or the like are produced through radical polymerization at high temperatures and high pressures. Moreover, copolymers (ionomers) of ethylene and unsaturated carboxylic acid metal salts are produced by reacting suitable metal compounds with the ethylene.unsaturated carboxylic acid copolymers.

In the case where the ethylene.polar monomer copolymer (B3) is ethylene.vinyl acetate copolymer, the content of the structural units derived from vinyl acetate is usually 10 to 30 percent by mass, preferably 15 to 30 percent by mass, and more preferably 15 to 25 percent by mass.

Furthermore, at this time, the melt flow rate MFR (ASTM D 1238) of ethylene.vinyl acetate copolymer at 190° C. and a load of 2160 g is usually 0.1 to 50 g/10 min, preferably 0.5 to 20 g/10 min, and more preferably 0.5 to 5 g/10 min.

The above-described ethylene.α-olefin copolymer (B2) and the ethylene.polar monomer copolymer (B3) are used in such a way that (B2)/(B3) becomes usually 100/0 to 20/80, and preferably 100/0 to 30/70 on a mass ratio basis.

In the case where the ethylene.polar monomer copolymer (B3) is used in the layer configuration of a laminate, the resulting cross-linked foam is excellent in adhesion to other layers formed from polyurethane, rubber, leather, and the like. In this regard, it is more preferable that the ethylene.polar monomer copolymer (B3) is used in such a way that the ethylene.α-olefin copolymer (B2)/the ethylene.polar monomer copolymer (B3) becomes 70/30 to 30/70 on a mass ratio basis. Furthermore, in the case where the ethylene.polar monomer copolymer (B3) is a copolymer of ethylene and the unsaturated carboxylic acid, when the ethylene.α-olefin copolymer (B2) and the ethylene.polar monomer copolymer (B3) are used at the above-described proportion, a cross-linked foam excellent in tear strength as well is obtained.

As described above, the rubber composition according to the present invention includes the above-described copolymer (A).

Moreover, the rubber composition according to the present invention includes a specific ethylene.α-olefin having 3 to 20 carbon atoms.nonconjugated polyene copolymer (A) synthesized by using the metallocene catalyst and at least one type of ethylene-based polymer (B) selected from an ethylene.α-olefin having 3 to 20 carbon atoms.nonconjugated polyene copolymers (B1) other than the copolymer (A), an ethylene.α-olefin copolymer (B2), and an ethylene.polar monomer copolymer (B3).

The above-described rubber composition includes usually 1 to 90 parts by weight, preferably 10 to 80 parts by weight of copolymer (A) and usually 10 to 99 parts by weight, preferably 20 to 90 parts by weight of ethylene-based polymer (B). In this regard, the total of the copolymer (A) and the ethylene-based polymer (B) is assumed to be 100 parts by weight.

The rubber composition according to the present invention can be blended with other components, e.g., a foaming agent, a foaming aid, a vulcanizing agent, a vulcanizing accelerator, a vulcanizing aid, a reinforcing agent, an inorganic filler, a softener, an antioxidant (stabilizer), a processing aid, an activator, and a moisture absorbent, in accordance with the purpose.

Foaming Agent

Examples of foaming agents include inorganic foaming agents, e.g., sodium bicarbonate and sodium carbonate; and organic foaming agents, for example, nitroso compounds, e.g., N,N'-dinitrosopentamethylenetetramine and N,N'-dinitrosoterephthalamide; azo compounds, e.g., azodicarbonamide and azobisisobutyronitrile; hydrazide compounds, e.g., benzenesulfonyl hydrazide and 4,4'-oxybis(benzenesulfonyl hydrazide); and azide compounds, e.g., calcium azide and 4,4'-diphenyldisulfonyl azide. Furthermore, examples of commercially available products include VINIFOR AC-2F (trade name; produced by EIWA CHEMICAL IND. CO. LTD.), VINIFOR AC#LQ (trade name; produced by EIWA CHEMICAL IND. CO. LTD., azodicarbonamide (abbreviation ADCA)), NEOCELLBORN N#1000SW (trade name; produced by EIWA CHEMICAL IND. CO. LTD., 4,4'-oxybis(benzenesulfonyl hydrazide) (abbreviation OBSH)), and CELLUAR D (trade name; produced by EIWA CHEMICAL IND. CO. LTD., N,N'-dinitrosopentamethylenetetramine (abbreviation DPT)).

It is preferable that the amount of blend of the foaming agent is usually 1 to 70 parts by weight, and preferably 3 to 60 parts by weight relative to 100 parts by weight of copolymer (A) from the viewpoint of the amount of generation of foaming gas. Furthermore, in the case where the ethylene-based polymer (B) is included, the amount of blend of the foaming agent is usually 1 to 70 parts by weight, and preferably 3 to 60 parts by weight relative to 100 parts by weight of the total of the copolymer (A) and the ethylene-based polymer (B).

Foaming Aid

The foaming aid may be added to the rubber composition according to the present invention in addition to the foaming agent, as necessary. The foaming aid has a function of lowering the decomposition temperature of the foaming agent, accelerating decomposition, uniforming bubbles, or the like.

Examples of foaming aid include organic acids, e.g., salicylic acid, phthalic acid, stearic acid, oxalic acid, and citric acid, or salts thereof; and urea and derivatives thereof. Examples of commercially available products include CELLPASTE K5 (trade name; produced by EIWA CHEMICAL IND. CO. LTD., urea) and FE-507 (trade name; produced by EIWA CHEMICAL IND. CO. LTD., sodium bicarbonate).

The amount of blend of the foaming aid is usually 0.1 to 5 parts by weight, and preferably 0.5 to 4 parts by weight relative to 100 parts by weight of copolymer (A). Furthermore, in the case where the ethylene-based polymer (B) is included, the amount of blend of the foaming aid is usually 0.1 to 5 parts by weight, and preferably 0.5 to 4 parts by weight relative to 100 parts by weight of the total of the copolymer (A) and the ethylene-based polymer (B).

Vulcanizing Agent

Examples of vulcanizing agents include sulfur-based compounds, organic peroxides, phenol resins, and oxime compounds.

As for the sulfur-based compounds, sulfur, sulfur chloride, sulfur dichloride, morpholine disulfide, alkylphenol disulfide, tetramethylthiuram sulfide, selenium dithiocarbamate, and the like are preferable, and sulfur, tetramethylthiuram sulfide, and the like are more preferable.

The amount of blend of the sulfur-based compounds is usually 0.3 to 10 parts by weight, preferably 0.5 to 5.0 parts by weight, and further preferably 0.7 to 4.0 parts by weight relative to 100 parts by weight of copolymer (A). It is favorable that the amount of blend of them is within the above-described range because there is no bloom on the surface of the resulting cross-linked foam and an excellent cross-linking characteristic is exhibited. Furthermore, in the case where the ethylene-based polymer (B) is included, the amount of blend of the sulfur-based compounds is usually 0.3 to 10 parts by weight, preferably 0.5 to 5.0 parts by weight, and further preferably 0.7 to 4.0 parts by weight relative to 100 parts by weight of the total of the copolymer (A) and the ethylene-based polymer (B).

As for the organic peroxides, dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethylcyclohexane, and t-dibutyl hydroperoxide are preferable, and dicumyl peroxide, di-t-butyl peroxide, and di-t-butylperoxy-3,3,5-trimethylcyclohexane are more preferable.

The amount of blend of the organic peroxides is usually 0.001 to 0.05 mol, preferably 0.002 to 0.02 mol, and more preferably 0.005 to 0.015 mol relative to 100 g of copolymer (A). It is favorable that the amount of blend of the organic peroxides is within the above-described range because there is no bloom on the surface of the resulting cross-linked foam and an excellent cross-linking characteristic is exhibited. Furthermore, in the case where the ethylene-based polymer (B) is included, the amount of blend of the organic peroxides is usually 0.001 to 0.05 mol, preferably 0.002 to 0.02 mol, and more preferably 0.005 to 0.015 mol relative to 100 g of the total of the copolymer (A) and the ethylene-based polymer (B).

Vulcanizing Accelerator

In the case where the sulfur-based compounds are used as the vulcanizing agent, it is preferable that the vulcanizing accelerator is used in combination.

Examples of vulcanizing accelerators include thiazole-based agents, e.g., N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (for example, Sanceler M (trade name; produced by SANSHIN CHEMICAL INDUSTRY CO. LTD.)), 2-(4-morphorinodithio)benzothiazole (for example, NOCCELER MDB-P (trade name; produced by SANSHIN CHEMICAL INDUSTRY CO. LTD.)), 2-(2,4-dinitrophenyl)mercaptobenzothiazole, 2-(2,6-diethyl-4-morphorinothio)benzothiazole, and dibenzothiazyl disulfide; guanidine-based agents, e.g., diphenylguanidine, triphenylguanidine, and di-ortho-tolylguanidine; aldehydeamine-based agents, e.g., acetaldehyde.aniline condensate and butylaldehyde.aniline condensate; imidazoline-based agents, e.g., 2-mercaptoimidazoline; thiourea-based agents, e.g., diethylthiourea and dibutylthiourea; thiuram-based agents, e.g., tetramethylthiuram monosulfide and tetramethylthiuram disulfide; dithioic acid salt-based agents, e.g., zinc dimethyldithiocarbamate, zinc diethyldithiocarbamate, zinc dibutyldithiocarbamate (for example, Sanceler PZ, Sanceler BZ, Sanceler EZ, and Sanceler M (trade name; produced by SANSHIN CHEMICAL INDUSTRY CO. LTD.)), and tellurium diethyldithiocarbamate; thiourea-based agents, e.g., ethylenethiourea (for example, Sanceler BUR (trade name; produced by SANSHIN CHEMICAL INDUSTRY CO. LTD.) and Sanceler 22-C (trade name; produced by SANSHIN CHEMICAL INDUSTRY CO. LTD.)) and N,N'-diethylthiourea; xanthate-based agents, e.g., zinc dibutylxanthate; and zinc white (for example, META-Z102 (trade name; produced by Inoue Calcium Corporation, zinc oxide)).

The amount of blend of the vulcanizing accelerator is usually 0.1 to 20 parts by weight, preferably 0.2 to 15 parts by weight, and more preferably 0.5 to 10 parts by weight relative to 100 parts by weight of copolymer (A). Furthermore, in the case where the ethylene-based polymer (B) is included, the amount of blend of the vulcanizing accelerator is usually 0.1 to 20 parts by weight, preferably 0.2 to 15 parts by weight, and more preferably 0.5 to 10 parts by weight relative to 100 parts by weight of the total of the copolymer (A) and the ethylene-based polymer (B).

It is preferable that the amounts of blend of the foaming agent, the foaming aid, the vulcanizing agent, and the vulcanizing accelerator are within the above-described ranges because there is no bloom on the surface of the resulting cross-linked foam and an excellent cross-linking characteristic is exhibited.

Vulcanizing Aid

Examples of vulcanizing aid include quinone dioxime-based agents, e.g., p-quinonedioxime; acryl-based agents, e.g., ethylene glycol dimethacrylate and trimethylolpropane trimethacrylate; allyl-based agents, e.g., diallyl phthalate and triallyl isocyanurate (for example, M-60 (trade name; produced by Nippon Kasei Chemical Company Limited)); maleimide-based agents; divinylbenzene; magnesium oxide/zinc white (for example, META-Z102 (trade name; produced by Inoue Calcium Corporation). The vulcanizing aid can be selected appropriately in accordance with the purpose thereof. One type of the vulcanizing aid may be used alone or at least two types may be used in combination.

The amount of blend of the vulcanizing aid is usually 1 to 20 parts by weight relative to 100 parts by weight of copolymer (A). Furthermore, in the case where the ethylene-based polymer (B) is included, the amount of blend of the vulcanizing aid is usually 1 to 20 parts by weight relative to 100 parts by weight of the total of the copolymer (A) and the ethylene-based polymer (B).

Reinforcing Agent and Inorganic Filler

The rubber composition according to the present invention can be blended with the reinforcing agent or the inorganic filler for the purpose of improving the mechanical properties, e.g., the tensile strength, the tear strength, and the abrasion resistance.

Examples of reinforcing agents include carbon black, e.g., Asahi #55G, Asahi #50HG, and Asahi #60G (trade name; produced by ASAHI CARBON CO., LTD.) and SEAST (SRF, GPF, FEF, MAF, HAF, ISAF, SAF, FT, MT, and the like (produced by TOKAI CARBON CO., LTD.)); agents produced through surface treatment of the above-described carbon black with a silane coupling agent or the like; silica; activated calcium carbonate; and fine powder talc and fine powder silicic acid. Among them, Asahi #55G, Asahi #50HG, SEAST HAF, and the like are preferable.

Examples of inorganic fillers include light calcium carbonate, heavy calcium carbonate, talc, and clay. Among them, heavy calcium carbonate is preferable. In this regard, as for heavy calcium carbonate, for example, commercially available Whiton SB (trade name; produced by SHIRAISHI CALCIUM KAISHA, LTD.) and the like are used.

The amount of blend of the reinforcing agent or the inorganic filler is usually 30 to 200 parts by weight, preferably 50 to 180 parts by weight, and more preferably 70 to 160 parts by weight relative to 100 parts by weight of copolymer (A). Furthermore, in the case where the ethylene-based polymer (B) is included, the amount of blend of the reinforcing agent or the inorganic filler is usually 30 to 200 parts by weight, preferably 50 to 180 parts by weight, and more preferably 70 to 160 parts by weight relative to 100 parts by weight of the total of the copolymer (A) and the ethylene-based polymer (B).

In the case where the amount of blend of the reinforcing agent or the inorganic filler is within the above-described range, the rubber composition according to the present invention is excellent in kneadability, and the resulting cross-linked formed member is excellent in mechanical properties, e.g., strength and flexibility, and in compression set.

Softener

Examples of softeners include petroleum-based softeners, e.g., process oil (for example, Diana process oil PS-430 (trade name; produced by Idemitsu Kosan Co., Ltd)), lubricating oil, paraffin oil, liquid paraffin, petroleum asphalt, and vaseline; coal tar-based softeners, e.g., coal tar and coal tar pitch; fatty oil-based softeners, e.g., caster oil, linseed oil, rapeseed oil, soybean oil, and coconut oil; wax, e.g., bees wax, carnauba wax, and lanolin; fatty acids or salts thereof, e.g., ricinoleic acid, palmitic acid, stearic acid, barium stearate, calcium stearate, and zinc laurate; naphthenic acid, pine oil, and rosin, or derivatives thereof; synthetic polymer materials, e.g., terpene resins, petroleum resins, atactic polypropylenes, and coumaroneindene resins; ester-based softeners, e.g., dioctyl phthalate, dioctyl adipate, and dioctyl sebacate; and microcrystalline wax, liquid polybutadiene, modified liquid polybutadiene, liquid thiokol, hydrocarbon-based synthetic lubricating oil, tall oil, and substitute (factice). Among them, petroleum-based softeners are preferable, and in particular process oil is preferable. One type of softeners may be used alone or at least two types may be used in combination.

The amount of blend of the softener can be selected appropriately in accordance with the use thereof.

The amount of blend of the softener is usually 200 parts by weight, preferably 150 parts by weight, and more preferably 130 parts by weight at the maximum relative to 100 parts by weight of copolymer (A). Furthermore, in the case where the ethylene-based polymer (B) is included, the amount of blend of the softener is usually 200 parts by weight, preferably 150 parts by weight, and more preferably 130 parts by weight at the maximum relative to 100 parts by weight of the total of the copolymer (A) and the ethylene-based polymer (B).

Antioxidant (Stabilizer)

As for the rubber composition according to the present invention, the product life can be increased by using the antioxidant in a manner similar to that in the usual rubber composition.

Examples of antioxidants include previously publicly known antioxidants; e.g., amine-based antioxidants, phenol-based antioxidants, and sulfur-based antioxidants. Specific examples include aromatic secondary amine-based antioxidants, e.g., phenylbutylamine and N,N'-di-2-naphthyl-p-phenylenediamine; phenol-based antioxidants, e.g., dibutylhydroxytoluene and tetrakis[methylene(3,5-di-t-butyl-4-hydroxy)hydrocinnamate]methane; thioether-based antioxidants, e.g., bis[2-methyl-4-(3-n-alkylthiopropionyloxy)-5-t-butylphenyl]sulfide; dithiocarbamate-based antioxidants, e.g., nickel dibutyldithiocarbamate; zinc salt of 2-mercaptobenzoylimidazole or 2-mercaptobenzimidazole; and sulfur-based antioxidants, e.g., dilaurylthiodipropionate and distearylthiodipropionate. One type of these antioxidants may be used alone or at least two types may be used in combination.

The amount of blend of the antioxidant is usually 0.3 to 10 parts by weight, preferably 0.5 to 7.0 parts by weight, and more preferably 0.7 to 5.0 parts by weight relative to 100 parts by weight of copolymer (A). Furthermore, in the case where the ethylene-based polymer (B) is included, the amount of blend of the antioxidant is usually 0.3 to 10 parts by weight, preferably 0.5 to 7.0 parts by weight, and more preferably 0.7 to 5.0 parts by weight relative to 100 parts by weight of the total of the copolymer (A) and the ethylene-based polymer (B).

It is preferable that the amount of blend of the antioxidant is within the above-described range because there is no bloom on the surface of the resulting rubber composition and, furthermore, vulcanization is not inhibited.

Processing Aid

As for the processing aid, those generally blended as the processing aid into rubber can be used widely. Specific examples include ricinoleic acid, palmitic acid, lauric acid, stearic acid, stearic acid esters, barium stearate, zinc stearate, and calcium stearate. Among them, stearic acid is preferable.

The amount of blend of the processing aid is usually 10 parts by weight or less, preferably 8.0 parts by weight or less, and more preferably 5.0 parts by weight or less relative to 100 parts by weight of copolymer (A). Furthermore, in the case where the ethylene-based polymer (B) is included, the amount of blend of the processing aid is usually 10 parts by weight or less, preferably 8.0 parts by weight or less, and more preferably 5.0 parts by weight or less relative to 100 parts by weight of the total of the copolymer (A) and the ethylene-based polymer (B).

It is preferable that the amount of blend of the processing aid is within the above-described range because there is no bloom on the surface of the resulting rubber composition and, furthermore, vulcanization is not inhibited.

Activator

Examples of activators include amines, e.g., di-n-butylamine, dicyclohexylamine, monoethanolamine, Acting B (trade name; produced by Yoshitomi Pharmaceutical Industries Ltd.), and Acting SL (trade name; produced by Yoshitomi Pharmaceutical Industries Ltd.); activators, e.g., diethylene glycol, polyethylene glycol (for example, PEG#4000 (trade name; produced by Lion Corporation)), lecithin, triallyl trimellitate, and zinc compounds of aliphatic and aromatic carboxylic acids (for example, Struktol activator 73, Struktol IB 531, and Struktol FA 541 (trade name; produced by Schill & Seilacher)); zinc peroxide adjusted substances, e.g., ZEONET ZP (trade name; produced by ZEON Corporation); octadecyltrimethylammonium bromide; synthetic hydrotalcite; and special quaternary ammonium compounds (for example, Arquad 2HF (trade name; Lion Akzo Co., ltd.). Among them, polyethylene glycol (for example, PEG#4000 (trade name; produced by Lion Corporation)) and Arquad 2HF are preferable. One type of this activator may be used alone or at least two types may be used in combination.

The amount of blend of the activator is usually 0.2 to 10 parts by weight, preferably 0.3 to 5 parts by weight, and more preferably 0.5 to 4 parts by weight relative to 100 parts by weight of copolymer (A). Furthermore, in the case where the ethylene-based polymer (B) is included, the amount of blend of the activator is usually 0.2 to 10 parts by weight, preferably 0.3 to 5 parts by weight, and more preferably 0.5 to 4 parts by weight relative to 100 parts by weight of the total of the copolymer (A) and the ethylene-based polymer (B).

Moisture absorbent

Examples of moisture absorbents include calcium oxide, silica gel, sodium sulfate, molecular sieve, zeolite, and white carbon. Among them, calcium oxide is preferable. The above-described moisture absorbent can be selected appropriately in accordance with the purpose thereof. One type may be used alone or at least two types may be used in combination.

The amount of blend of the moisture absorbent is usually 0.5 to 15 parts by weight, preferably 1.0 to 12 parts by weight, and more preferably 1.0 to 10 parts by weight relative to 100 parts by weight of copolymer (A). Furthermore, in the case where the ethylene-based polymer (B) is included, the amount of blend of the moisture absorbent is usually 0.5 to 15 parts by weight, preferably 1.0 to 12 parts by weight, and more preferably 1.0 to 10 parts by weight relative to 100 parts by weight of the total of the copolymer (A) and the ethylene-based polymer (B).

[Cross-Linked Rubber]

The cross-linked rubber according to the present invention is produced through cross-linking of the above-described rubber composition by, for example, two methods described below.

A first method is a method (i), in which the above-described rubber composition blended with the vulcanizing agent is preformed into a desired shape by various forming methods usually including extruders, calender rolls, presses, injection molding machines, transfer molding machines, heating baths with heating modes of hot air, glass beads fluidized-bed, UHF (ultrahigh frequency electromagnetic wave), steam, LCM (hot molten salt bath), and the like, and heating is conducted at the same time with the performing or after the formed member is introduced in a vulcanization bath.

As for the method (i), the above-described vulcanizing agent is used and the vulcanizing accelerator and/or the vulcanizing aid is used in combination, as necessary. In this regard, in general, the temperature in the heating is 140° C. to 300° C., preferably 150° C. to 270° C., and more preferably 150° C. to 250° C. and heating is conducted for usually 0.5 to 30 minutes, preferably 0.5 to 20 minutes, and more preferably 0.5 to 15 minutes.

In the forming and the vulcanization of the above-described rubber composition, a die may be used or no die may be used. In the case where a die is not used, the rubber composition is usually formed and vulcanized continuously.

A second method is a method (ii), in which the above-described rubber composition is preformed by the above-described forming method and electron beams are applied.

As for the method (ii), the perform is irradiated with electron beams of 0.1 to 10 MeV in such a way that the absorbed dose becomes, for example, 0.5 to 35 Mrad, preferably 0.5 to 20 Mrad, and more preferably 1 to 10 Mrad.

[Cross-Linked Foam]

The cross-linked foam according to the present invention is a cross-linked foam produced by subjecting the above-described rubber composition to cross-linking foaming. The specific gravity of the cross-linked foam is preferably 0.02 to 0.3, further preferably 0.02 to 0.20, and most preferably 0.02 to 0.10.

In order to subject the above-described rubber composition to cross-linking foaming, usually, the foaming agent is added to the rubber composition, and cross-linking foaming is effected. As for an example of the cross-linking foaming, a method is mentioned, in which the rubber composition is extruded by using a 60-mm diameter extruder equipped with a tabular die (width 15 mm, thickness 4 mm) under the condition of a die temperature of 80° C. and a cylinder temperature of 60° C. so as to be formed into a sheet and, immediately thereafter, is introduced into a vulcanization bath to undergo cross-linking foaming through heating at 220° C. for 4 minutes, so that a tabular sponge is produced.

The cross-linked foam according to the present invention has a large expansion ratio and, therefore, a small specific gravity. Furthermore, excellent shape stability is exhibited. Consequently, in the case where the cross-linked foam according to the present invention is used, a lightweight, flexible highly-foamed sponge, a heat-insulating sponge, a dam rubber, and the like can be produced with good productivity.

The cross-linked foam according to the present invention is favorably used for, for example, automobile exterior materials e.g., glass run channels and weather strip sponges, and radiator hose materials.

EXAMPLES

The present invention will be described in detail with reference to the examples. However, the present invention is not limited to these examples.

The properties of the copolymer (A) and the rubber composition are measured as described below.

[Amount of moles of structural units derived from α-olefin [B] having 3 to 20 carbon atoms, percent by mole of structural units derived from nonconjugated polyene [C-1], in which among carbon-carbon double bonds, only one carbon-carbon double bond polymerizable with metallocene catalyst is present in one molecule, and percent by mole of structural units derived from nonconjugated polyene [C-2], in which among the carbon-carbon double bonds, two carbon-carbon double bonds polymerizable with metallocene catalyst are present in one molecule]

These are determined through the intensity measurement with a $^{13}$C-NMR spectrometer.
Apparatus: EX400 nuclear magnetic resonance apparatus (produced by JEOL LTD.)
Measurement Condition
  Frequency: 100 MHz
  Pulse width: 5.1 μsec (45°)
  Repetition time: 5.5 sec
  The number of integration: 8,000 times
  Measurement solvent: ODCB/$C_6D_4$=4/1 (volume ratio)
  Measurement temperature: 120° C.

[Apparent iodine value (IV) of structural units derived from nonconjugated polyene [C-2], in which among the carbon-carbon double bonds, two carbon-carbon double bonds polymerizable with metallocene catalyst are present in one molecule]

The value was determined with a $^1$H-NMR spectrometer and a $^{13}$C-NMR spectrometer.
Apparatus: EX400 nuclear magnetic resonance apparatus (produced by JEOL LTD.)
Measurement Condition
  Frequency: 400 MHz
  Pulse width: 6.8 μsec (45°)
  Repetition time: 7.0 sec
  The number of integration: 512 times
  Measurement solvent: ODCB-$d_4$
  Measurement temperature: 120° C.

[Mooney viscosity [ML (1+4) 100° C.]]

The Mooney viscosity [ML (1+4) 100° C.] was measured by using a Mooney viscometer (Model SMV202 produced by SHIMADZU CORPORATION) in conformity with JIS K 6300.

In this regard, from an empirical rule, the following correlation is recognized between the Mooney viscosity [ML (1+4) 160° C.] measured at 160° C. and the Mooney viscosity [ML (1+4) 100° C.] measured at 100° C.

[ML (1+4) 100° C.]=2.38×[ML (1+4) 160° C.]

[Activation Energy of Fluidization (Ea)]

Regarding two temperatures of 170° C. and 210° C., the melt complex viscosity-frequency curve (unit of melt complex viscosity: Pa/sec, unit of frequency: Hz) of the copolymer (A) at each temperature (T, unit: ° C.) was superposed on the melt complex viscosity-frequency curve of the copolymer (A) at 190° C. on the basis of the temperature-time superposition principle and on a melt complex viscosity-frequency curve at each temperature (T) basis, so as to determine the shift factor (aT) at each temperature (T). A linear approximate expression (the following expression (I)) of ln(aT) and 1/(T+273.16) was calculated by the method of least squares from each temperature (T) and the shift factor (aT). Subsequently, Ea was determined from the gradient m of the linear expression (I) and the expression (II) described below.

$$\ln(aT)=m(1/(T+273.16))+n \quad \text{(I)}$$

$$Ea=0.008314 \times m \quad \text{(II)}$$

aT: shift factor, Ea: activation energy of fluidization (unit: kJ/mol)
T: temperature (unit: ° C.), n: Y axis intercept The above-described calculation was conducted by using a commercially available calculation software (RSI Orchestrator VER. 6.6.3 produced by TA Instruments Japan Inc.).

In this regard, the shift factor (aT) is the amount of movement in the case where the log-log curve of the melt complex viscosity-frequency at each temperature (T) is moved in a log(Y)=−log(X) axis direction (where the Y axis indicates the melt complex viscosity and the X axis indicates the frequency) and is superposed on the melt complex viscosity-frequency curve at 190° C. In the superposing, the log-log curve of the melt complex viscosity-frequency at each temperature (T) is moved on a curve basis in such a way that the frequency is multiplied by a factor of aT and the melt complex viscosity is multiplied by a factor of 1/aT. In this connection, in determination of the expression (I) from the values at three temperatures of 170° C., 190° C., and 210° C. by the method of least squares, the correlation coefficient is usually 0.99 or more.

The measurement of the above-described melt complex viscosity-frequency curve was conducted through the use of a viscoelasticity measuring apparatus (viscoelasticity tester (Model RDS-2) produced by Rheometric Scientific). Specifically, as for a sample, the copolymer (A) was pressed at 190° C. and the resulting sheet having a thickness of 2 mm was formed into a disk shape of 25 mm diameter×2 mm thickness. The resulting sample was used and the measurement was conducted under the following condition. In this regard, RSI Orchestrator VER. 6.6.3 (produced by TA Instruments Japan Inc.) was used as a data processing software. Moreover, it is preferable that the measurement sample is blended with an appropriate amount of the antioxidant (for example, 1,000 ppm) in advance.

Geometry: parallel plate
Measurement temperature: 170° C., 190° C., and 210° C.
Frequency: 0.5 to 79.577 Hz
Distortion factor: 1.0%

The frequency dependence of the viscosity was measured under the above-described condition, and the above-described Arrhenius plot was derived, so that the activation energy of fluidization was calculated.

The methods for measuring the properties of the rubber composition will be described below.

[Minimum Viscosity (Vm) and Scorch Time (t5)]

The property test of the unvulcanized rubber was conducted in conformity with JIS K 6300. Specifically, a Mooney viscometer (Model SMV202 produced by SHIMADZU CORPORATION) was used and changes in Mooney viscosity were measured at 125° C. The minimum viscosity (Vm) was determined at the start of the measurement and, furthermore, the time elapsed until the viscosity increased by 5 points from the minimum viscosity Vm was determined, and this was assumed to be the scorch time (t5, min).

[Specific Gravity]

A test piece of 20 mm×20 mm was stamped from an upper portion of a tube-shaped sponge, and stains on the surface were wiped off with alcohol. The resulting test piece was set in an automatic densometer (Model M-1; produced by Toyo Seiki Seisaku-sho, Ltd.) in an atmosphere at 25° C. The specific gravity was measured on the basis of the difference between the mass in the air and the mass in pure water.

[Timing Between Vulcanization and Foaming (TP20-TS1, Min)]

The measurement of the timing between vulcanization and foaming (TP20-TS1, min) was conducted by using a rotorless rheometer MDR 2000P produced by Alpha Technologies.

Specifically, a blank test at 160° C. for 5 minutes with 6 g of rubber composition containing appropriate amounts of vulcanizing agent and foaming agent was conducted initially as a preliminary test. An excess sample squeezed out of the chamber was removed and the weight W of the resulting cross-linked foam was measured. Subsequently, as a formal test, W g of rubber composition used in the preliminary test was put into the chamber, and the measurement was conducted at 160° C. for 20 minutes. The indicator of the foaming rate, TP20 (min), was calculated from the time elapsed until 20% of the difference between the maximum value and the minimum value of the foaming pressure was reached, and TS1 was calculated from the time elapsed until the cross-linking torque increased by 1 dNm from the minimum value. The timing between vulcanization and foaming (TP20-TS1, min) was derived therefrom. A negative numerical value indicates that the foaming reaction rate is larger than the cross-linking reaction rate.

[Evaluation of Kneadability]

MIXTRON BB MIXER (Model BB-4, produced by Kobe Steel, Ltd., volume 2.95 L, rotor 4WH) was used, 100 parts by weight of copolymer rubber was blended with 2 parts by weight of stearic acid serving as the processing aid, 30 parts by weight of "Asahi #50G" (trade name; ASAHI CARBON CO., LTD.) serving as a reinforcing agent, 150 parts by weight of "Whiton SB" (trade name; produced by SHIRAISHI CALCIUM KAISHA, LTD.) serving as the inorganic filler, and "Diana process oil PS-430" (trade name; produced by Idemitsu Kosan Co., Ltd) serving as the softener, which was added in such a way that the value of Mooney viscosity became the value of Mooney viscosity [ML(1+4) 100° C.] of the copolymer rubber+20, and kneading was conducted.

In this regard, the amount of the process oil was changed in order to keep the viscosity of the foaming medium (rubber composition), which is one of important factors related to foaming, and was specified to be adjusted on the basis of the Mooney viscosity of the copolymer rubber used.

The kneading was conducted under the condition, in which the number of revolutions of the rotor was 50 rpm, the floating weight pressure was 3 kg/cm$^2$, and the kneading time was 5 minutes. The cohesion of the resulting kneaded material at discharge was graded into three ranks on the basis of the following evaluation criteria.

AA: discharge is conducted in a group and an inadequately kneaded portion is not included.

BB: some inadequately kneaded portions are included and discharge is not easily conducted in a group.

CC: carbon black or oil remains in its original state and discharge is not conducted in a group.

[Evaluation of Shape Stability]

The shape of a cross-section of the resulting tabular sponge (cross-linked foam) was evaluated as described below and was judged on the basis of the following criteria.

AA: tabular sponge satisfying radius (R) of arc of formed member upper portion ≥30 mm (FIG. 1 shows an example of the shape.)

Figure 2:
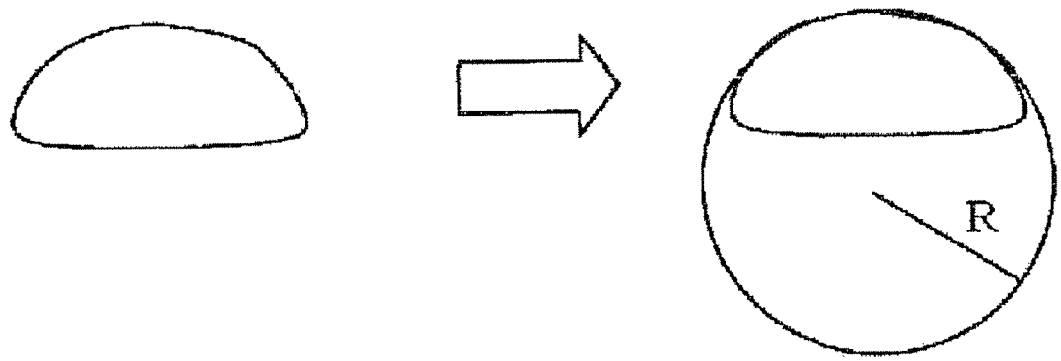
FIG. 2 shows an example of the shape of a mountain-shaped (semicircular) sponge and a conceptual diagram of a radius (R) of an arc of a formed member upper portion, in the shape stability evaluation in Example.

BB: mountain-shaped (semicircular) sponge satisfying radius (R) of arc of formed member upper portion <30 mm (FIG. 2 shows an example of the shape and a conceptual diagram of the radius (R) of the arc.)

[Tensile Strength (TB) and Tensile Elongation (EB)]

A test piece was obtained by being stamped from an upper portion of a tube-shaped sponge in a length direction with a No. 3 type dumbbell described in JIS K 6251 (1993). The resulting test piece was used and a tensile test was conducted following the method specified in the third item of the above-described JIS K 6251 under the condition of a measurement temperature of 25° C. and a pulling rate of 500 mm/min, so as to measure the tensile strength TB (MPa) and tensile elongation EB (%) at break.

[Compression Set (CS)]

The measurement was conducted in conformity with JIS K 6262. As for a sample, the foam was cut into the shape of a circular cylinder having a diameter of 30 mm and a thickness of 15 mm or more. Regarding each of the two parallel faces of the circular cylinder, the surface of the parallel face was cut by at least 2.5 mm, so that the thickness was made to be 10 mm, and the resulting sample was used. A dumbbell shaped for cutting into a circular cylinder was used in cutting of the foam into the circular cylinder and in cutting of the surfaces of the foam parallel faces.

The resulting sample was compressed to 50%, was stood for 6 hours in an environment at 50° C., and was released from compression, followed by measurement after a lapse of 30 minutes.

The height of the sample after the thermocompression treatment was measured and the compression set (%) was calculated on the basis of the following formula.

$$\text{compression set (\%)} = \{(t_0-t_1)/(t_0-t_2)\} \times 100$$

$t_0$: height of sample before test
$t_1$: height of sample after a lapse of 30 minutes from release from compression
$t_2$: height of sample in the state of being set in measurement die

[Shape Retention]

The ratio of the height to the diameter of a sponge after cross-linking foaming of the rubber composition formed into the shape of a circular cylinder was measured and was assumed to be the shape retention (%).

$$\text{shape retention (\%)} = (L/D) \times 100$$

L: height of circular cylinder sponge
D: inner diameter of circular cylinder sponge (maximum value of outside shape in horizontal direction)

[Shrinkage Factor of Hose]

An unvulcanized hose was cut into a length of 15 cm, and cross-linked material was produced through heating at 200° C. for 10 minutes. The length of the cross-linked material was measured and the shrinkage factor was calculated.

$$\text{shrinkage factor (\%)} = (15-L)/15 \times 100$$

Here, L represents the length (cm) of the cross-linked material.

[Surface Appearance]

A tube-shaped sponge was cut into 30 cm in the length direction, and the number of convex portions, which are referred to as blobs in general, on the sponge surface was counted visually.

[Hardness]

The type A durometer hardness was measured following JIS K 6253.

The Asker C hardness was measured at a temperature of 23° C. following "Spring hardness test type C testing method" described in JIS K 7312-1996 Annex 2.

[Melt Flow Rate (MFR)]

The melt flow rate was determined at a temperature of 190° C. following ASTM D1238.

The measurement value at a load of 2.16 kg was assumed to be $MFR_2$, and the measurement value at a load of 10 kg was assumed to be $MFR_{10}$.

[B value, Tαβ Intensity Ratio]

The measurement was conducted by using an NMR measuring apparatus JEOL-GX270 (produced by JEOL LTD.). The measurement was conducted by using a mixed solution of hexachlorobutadiene/benzene-$d_6$=2/1 (volume ratio), which was prepared in such a way that the sample concentration became 5 percent by mass, at 67.8 MHz and 25° C. with reference to benzene-$d_6$ (128 ppm). The measured $^{13}$C-NMR spectrum was analyzed on the basis of the proposal of Lindemanl.Adams ("Analytical Chemistry", Vol. 43, p. 1245 (1971)) and the report by J. C. Randall ("Reviews in Macromolecular Chemistry and Physics", C29, p. 201 (1989)), so as to determine the intensity ratio Tαβ/Tαα.

Example 1

A polymerization reactor having a volume of 300 L and being provided with a mixing blade was used, and polymerization reaction of a quaternary copolymer composed of a component [A]: ethylene, a component [B]: propylene, a component [C-1]: 5-ethylidene-2-norbornene (ENB), and a component [C-2]: 5-vinyl-2-norbornene (VNB) was conducted at 95° C. continuously.

Hexane (an amount of feed of 41 kg/h) was used as a polymerization solvent, and ethylene at an amount of feed of 5.3 kg/h, propylene at an amount of feed of 5.6 kg/h, ENB at an amount of feed of 900 g/h, and VNB at an amount of feed of 90 g/h were fed into the polymerization reactor continuously. The polymerization pressure was maintained at 1.5 MPa, and a catalyst, (t-butylamide)dimethyl($\eta^5$-2-methyl-s-indacen-1-yl)silane-titanium(II)1,3-pentadiene, which has the structure represented by the above-described formula (VIII), was used as a main catalyst and was fed into the polymerization reactor continuously in such a way as to become 0.05 mmol/h. In addition, each of 0.25 mmol/h of $(C_6H_5)_3CB(C_6F_5)_4$ serving as a co-catalyst and 15 mmol/h of triisobutylaluminum (TIBA) serving as an organic aluminum compound was fed into the polymerization reactor continuously.

In this manner, a polymerization solution containing 16.6 percent by weight of copolymer composed of ethylene, propylene, ENB, and VNB was produced. A small amount of methanol was added to the polymerization solution drawn from the lower portion of the polymerization reactor, so as to terminate the polymerization reaction. After the polymer was separated from the solvent through a steam stripping treatment, drying under reduced pressure was conducted at 80° C. for one whole day and night. Table 1 shows the polymerization condition and the properties of the resulting copolymer (A).

Examples 2 to 7 and Comparative Examples 1 to 3

Synthesis was conducted under the same condition as that in Example 1 except that the amounts of feed of ethylene, propylene, ENB, and VNB were changed in Example 1. Table 1 shows the polymerization condition and the properties of the resulting copolymer (A).

Comparative Example 4

A polymerization reactor having a volume of 15 L and being provided with a mixing blade was used, and polymerization reaction of a ternary copolymer composed of ethylene, propylene, and 5-ethylidene-2-norbornene (ENB) was conducted continuously.

Hexane serving as a polymerization solvent was fed from the upper portion of the polymerization reactor at a rate of L/h continuously. On the other hand, the polymerization solution was drawn from the lower portion of the polymerization reactor continuously in such a way that the polymerization solution in the polymerization reactor was always 5 liter. As for the catalyst, $VOCl_3$ and $Al(C_2H_5)_{1.5}Cl_{1.5}$ were used. Continuous feeding of $VOCl_3$ into the polymerization reactor was conducted in such a way that the vanadium atom concentration in the polymerization reactor became 0.55 mmol/L and feeding of $Al(C_2H_5)_{1.5}Cl_{1.5}$ was conducted in such a way that the aluminum atom concentration in the polymerization reactor became 3.3 mmol/L.

The monomers of ethylene at a rate of 170 L/h and propylene at a rate of 375 L/h were fed into the polymerization reactor continuously. Furthermore, ENB was fed continuously in such a way that the concentration in the polymerization reactor became 7.5 g/L. As for the molecular weight modifier, hydrogen was used, and the hydrogen was fed in such a way that the hydrogen concentration in the polymerization reactor gas phase became 3.1 percent by mole. The copolymerization reaction was conducted at a temperature of 40° C. while the polymerization pressure was maintained at 0.7 MPa and cooling water was circulated in an external jacket of the polymerization reactor.

According to such a reaction, a copolymer composed of ethylene, propylene, and ENB was produced as a homogeneous polymerization solution. A small amount of methanol was added to the polymerization solution drawn from the lower portion of the polymerization reactor, so as to terminate the polymerization reaction. After the polymer was separated from the solvent through a steam stripping treatment, drying under reduced pressure was conducted at 80° C. for one whole day and night. The copolymer composed of ethylene, propylene, and ENB was produced at a rate of 265 g per hour by the above-described operations.

[Table 1]

the floating weight pressure was 3 kg/cm$^2$, and the kneading time was 5 minutes, and the kneading discharge temperature was 145° C.

Subsequently, it was ascertained that the temperature of the above-described compound reached 40° C. Thereafter, a 14-inch roll was used and the above-described compound was kneaded with 1.5 parts by weight of "Sanceler M" (trade name; produced by SANSHIN CHEMICAL INDUSTRY CO. LTD.) serving as the vulcanizing accelerator, 1.5 parts by weight of "Sanceler BZ" (trade name; produced by SANSHIN CHEMICAL INDUSTRY CO. LTD.) serving as the vulcanizing accelerator, 1.5 parts by weight of "Sanceler PZ" (trade name; produced by SANSHIN CHEMICAL INDUSTRY CO. LTD.) serving as the vulcanizing accelerator, 1.0 part by weight of "Sanceler BUR" (trade name; produced by

TABLE 1

Properties of copolymer rubber

Properties of copolymer (A)

|  | Propylene [percent by mole] | Nonconjugated polyene Total of percent by mole | ENB/VNB Ratio of percent by mole | VNB Iodine value/ (g/100 g) | ML(1 + 4) 100° C. | Activation energy of fluidization kJ/mol |
|---|---|---|---|---|---|---|
| Example 1 | 41.2 | 2.76 | 87.3/12.7 | 1.42 | 28 | 41.2 |
| Example 2 | 41.1 | 2.65 | 88.3/11.7 | 1.13 | 25 | 39.9 |
| Example 3 | 41.0 | 2.58 | 88.4/11.6 | 1.04 | 25 | 37.9 |
| Example 4 | 40.0 | 2.47 | 92.7/7.3 | 0.5 | 27 | 35.5 |
| Example 5 | 38.8 | 2.94 | 88.4/11.6 | 1.32 | 45 | 39.3 |
| Example 6 | 31.2 | 2.51 | 88.0/12.0 | 1.11 | 78 | 38.1 |
| Example 7 | 34.4 | 1.85 | 81.2/18.8 | 1.42 | 40 | 39.3 |
| Comparative example 1 | 40.7 | 3.22 | 95.1/4.9 | 0.40 | 110 | 34.3 |
| Comparative example 2 | 37.7 | 3.41*[1] | — | 0 | 38 | 31.1 |
| Comparative example 3 | 39.9 | 3.11*[1] | — | 0 | 39 | 34.0 |
| Comparative example 4 | 35.8 | 3.30*[1] | — | 0 | 43 | 30.3 |

*[1]As for nonconjugated polyene, only ENB was used.

Example 8

The rubber composition and the sponge (cross-linked foam) according to the present invention were produced by a manufacturing method as described below.

Initially, as for a rubber composition before vulcanization and foaming with respect to the rubber composition according to the present invention, MIXTRON BB MIXER (Type BB-4, produced by Kobe Steel, Ltd., volume 2.95 L, rotor 4WH) was used, and 20 parts by weight of polyethylene (trade name: MIRASON 27), 8 parts by weight of "META-Z102" (trade name; produced by Inoue Calcium Corporation) serving as the vulcanizing aid, 2 parts by weight of stearic acid serving as the processing aid, 1 part by weight of "PEG#4000" (trade name; polyethylene glycol, produced by Lion Corporation) serving as the activator, 30 parts by weight of "Asahi #50G" (trade name; produced by ASAHI CARBON CO., LTD.) serving as a reinforcing agent, 150 parts by weight of "Whiton SB" (trade name; produced by SHIRAISHI CALCIUM KAISHA, LTD.) serving as the inorganic filler, and 45 parts by weight of "Diana process oil PS-430" (trade name; produced by Idemitsu Kosan Co., Ltd) serving as the softener relative to 100 parts by weight of the copolymer (the ethylene.propylene.nonconjugated polyene copolymer in Example 1) were kneaded. As for the kneading condition, the number of revolutions of the rotor was 50 rpm, SANSHIN CHEMICAL INDUSTRY CO. LTD.) serving as the vulcanizing accelerator, 1.5 parts by weight of sulfur serving as the vulcanizing agent, 20 parts by weight of "VINIFOR AC#LQ" (trade name; produced by EIWA CHEMICAL IND. CO. LTD.) serving as the foaming agent, and 1.5 parts by weight of "CELLPASTE K5" (trade name; produced by EIWA CHEMICAL IND. CO. LTD.) serving as the foaming aid. As for the kneading condition, sheeting was conducted under the condition of roll temperatures of front roll/rear roll=80° C./80° C., roll peripheral speeds of front roll/rear roll=13 rpm/11.5 rpm, a roll gap of 5 mm, and a kneading time of 15 minutes.

Then, the resulting rubber compound was extruded by using a 50-mm diameter extruder equipped with a tabular die (width 15 mm, thickness 4 mm) under the condition of a die temperature of 80° C. and a cylinder temperature of 60° C., so as to be formed into a tabular shape. Immediately after the forming, the resulting formed member was introduced into a vulcanization bath to effect cross-linking reaction and foaming reaction through heating at a temperature of 220° C. for 4 minutes, so that a tabular sponge was produced. The property values of the tabular sponge are shown in Table 2.

Example 9

The same procedure as in Example 8 was executed except that in Example 8, the ethylene.propylene.nonconjugated polyene copolymer in Example 2 was used as the copolymer (A) (copolymer rubber) instead of the ethylene.propylene.nonconjugated polyene copolymer in Example 1. The property values of the tabular sponge are shown in Table 2.

Example 10

The same procedure as in Example 8 was executed except that in Example 8, the ethylene.propylene.nonconjugated polyene copolymer in Example 3 was used as the copolymer (A) instead of the ethylene.propylene.nonconjugated polyene copolymer in Example 1. The property values of the tabular sponge are shown in Table 2.

Example 11

The same procedure as in Example 8 was executed except that in Example 8, the ethylene.propylene.nonconjugated polyene copolymer in Example 4 was used as the copolymer (A) instead of the ethylene.propylene.nonconjugated polyene copolymer in Example 1. The property values of the tabular sponge are shown in Table 2.

Example 12

The same procedure as in Example 8 was executed except that in Example 8, the ethylene.propylene.nonconjugated polyene copolymer in Example 5 was used as the copolymer (A) instead of the ethylene.propylene.nonconjugated polyene copolymer in Example 1. The property values of the tabular sponge are shown in Table 2.

Example 13

The same procedure as in Example 12 was executed except that in Example 12, the amount of "Sanceler BUR" (trade name; produced by SANSHIN CHEMICAL INDUSTRY CO. LTD.) serving as the vulcanizing accelerator was changed from 1.0 part by weight to 0.5 part by weight and the amount of "CELLPASTE K5" (trade name; produced by EIWA CHEMICAL IND. CO. LTD.) serving as the foaming aid was changed from 1.5 parts by weight to 2.0 parts by weight. The property values of the tabular sponge are shown in Table 2.

Example 14

The same procedure as in Example 12 was executed except that in Example 12, the amount of "Sanceler BUR" (trade name; produced by SANSHIN CHEMICAL INDUSTRY CO. LTD.) serving as the vulcanizing accelerator was changed from 1.0 part by weight to 1.5 parts by weight. The property values of the tabular sponge are shown in Table 2.

Example 15

The same procedure as in Example 12 was executed except that in Example 12, the amount of "Sanceler BUR" (trade name; produced by SANSHIN CHEMICAL INDUSTRY CO. LTD.) serving as the vulcanizing accelerator was changed from 1.0 part by weight to 1.5 parts by weight and the amount of "CELLPASTE K5" (trade name; produced by EIWA CHEMICAL IND. CO. LTD.) serving as the foaming aid was changed from 1.5 parts by weight to 1.0 part by weight. The property values of the tabular sponge are shown in Table 3.

Example 16

The same procedure as in Example 8 was executed except that in Example 8, the ethylene.propylene.nonconjugated polyene copolymer in Example 6 was used as the copolymer (A) instead of the ethylene.propylene.nonconjugated polyene copolymer in Example 1. The property values of the tabular sponge are shown in Table 3.

Example 17

The same procedure as in Example 8 was executed except that in Example 8, the ethylene.propylene.nonconjugated polyene copolymer in Example 7 was used as the copolymer (A) instead of the ethylene.propylene.nonconjugated polyene copolymer in Example 1. The property values of the tabular sponge are shown in Table 3.

Comparative Example 5

The same procedure as in Example 8 was executed except that in Example 8, the ethylene.propylene.nonconjugated polyene copolymer in Comparative example 1 was used as the copolymer rubber instead of the ethylene.propylene.nonconjugated polyene copolymer in Example 1. The property values of the tabular sponge are shown in Table 3.

Comparative Example 6

The same procedure as in Example 8 was executed except that in Example 8, the ethylene.propylene.nonconjugated polyene copolymer in Comparative example 2 was used as the copolymer rubber instead of the ethylene.propylene.nonconjugated polyene copolymer in Example 1, the amount of "Sanceler BUR" (trade name; produced by SANSHIN CHEMICAL INDUSTRY CO. LTD.) serving as the vulcanizing accelerator was changed from 1.0 part by weight to 0.5 part by weight and the amount of "CELLPASTE K5" (trade name; produced by EIWA CHEMICAL IND. CO. LTD.) serving as the foaming aid was changed from 1.5 parts by weight to 2.0 parts by weight. The property values of the tabular sponge are shown in Table 3.

Comparative Example 7

The same procedure as in Example 8 was executed except that in Example 8, the ethylene.propylene.nonconjugated polyene copolymer in Comparative example 2 was used as the copolymer rubber instead of the ethylene.propylene.nonconjugated polyene copolymer in Example 1. The property values of the tabular sponge are shown in Table 3.

Comparative Example 8

The same procedure as in Example 8 was executed except that in Example 8, the ethylene.propylene.nonconjugated polyene copolymer in Comparative example 2 was used as the copolymer rubber instead of the ethylene.propylene.nonconjugated polyene copolymer in Example 1, the amount of "Sanceler BUR" (trade name; produced by SANSHIN CHEMICAL INDUSTRY CO. LTD.) serving as the vulcanizing accelerator was changed from 1.0 part by weight to 1.5 parts by weight and the amount of "CELLPASTE K5" (trade name; produced by EIWA CHEMICAL IND. CO. LTD.) serving as the foaming aid was changed from 1.5 parts by weight to 1.0 part by weight. The property values of the tabular sponge are shown in Table 3.

Comparative Example 9

The same procedure as in Example 8 was executed except that in Example 8, the ethylene.propylene.nonconjugated polyene copolymer in Comparative example 3 was used as the copolymer rubber instead of the ethylene.propylene.nonconjugated polyene copolymer in Example 1, the amount of "Sanceler BUR" (trade name; produced by SANSHIN CHEMICAL INDUSTRY CO. LTD.) serving as the vulcanizing accelerator was changed from 1.0 part by weight to 0.5 part by weight and the amount of "CELLPASTE K5" (trade name; produced by EIWA CHEMICAL IND. CO. LTD.) serving as the foaming aid was changed from 1.5 parts by weight to 2.0 parts by weight. The property values of the tabular sponge are shown in Table 4.

Comparative example 10

The same procedure as in Example 8 was executed except that in Example 8, the ethylene.propylene.nonconjugated polyene copolymer in Comparative example 3 was used as the copolymer rubber instead of the ethylene.propylene.nonconjugated polyene copolymer in Example 1. The property values of the tabular sponge are shown in Table 4.

Comparative example 11

The same procedure as in Example 8 was executed except that in Example 8, the ethylene.propylene.nonconjugated polyene copolymer in Comparative example 4 was used as the copolymer rubber instead of the ethylene.propylene.nonconjugated polyene copolymer in Example 1, the amount of "Sanceler BUR" (trade name; produced by SANSHIN CHEMICAL INDUSTRY CO. LTD.) serving as the vulcanizing accelerator was changed from 1.0 part by weight to 0.5 part by weight and the amount of "CELLPASTE K5" (trade name; produced by EIWA CHEMICAL IND. CO. LTD.) serving as the foaming aid was changed from 1.5 parts by weight to 2.0 parts by weight. The property values of the tabular sponge are shown in Table 4.

Comparative example 12

The same procedure as in Example 8 was executed except that in Example 8, the ethylene.propylene.nonconjugated polyene copolymer in Comparative example 4 was used as the copolymer rubber instead of the ethylene.propylene.nonconjugated polyene copolymer in Example 1. The property values of the tabular sponge are shown in Table 4.

TABLE 2

| | Properties of cross-linked foam | | | | | | |
|---|---|---|---|---|---|---|---|
| | Example 8 | Example 9 | Example 10 | Example 11 | Example 12 | Example 13 | Example 14 |
| Copolymer (A) used | Example 1 | Example 2 | Example 3 | Example 4 | Example 5 | Example 5 | Example 5 |
| Vm | 14 | 13 | 14 | 14 | 17 | 17 | 17 |
| TP20-TS1  Min | −0.8 | −0.9 | −0.7 | −1.0 | −1.1 | −1.8 | 0.4 |
| Kneadability | AA | AA | AA | AA | AA | AA | AA |
| Shape stability | AA | AA | AA | AA | AA | AA | AA |
| Specific gravity | 0.07 | 0.08 | 0.08 | 0.14 | 0.08 | 0.10 | 0.08 |

TABLE 3

| | Properties of cross-linked foam | | | | | | |
|---|---|---|---|---|---|---|---|
| | Example 15 | Example 16 | Example 17 | Comparative example 5 | Comparative example 6 | Comparative example 7 | Comparative example 8 |
| Copolymer (A) used | Example 5 | Example 6 | Example 7 | Comparative example 1 | Comparative example 2 | Comparative example 2 | Comparative example 2 |
| Vm | 17 | 30 | 18 | 54 | 17 | 17 | 17 |
| TP20-TS1  Min | 1.4 | −0.4 | −2.2 | −0.6 | −1.6 | 0.2 | 1.0 |
| Kneadability | AA | BB | AA | CC | AA | AA | AA |
| Shape stability | AA | AA | AA | AA | BB | BB | BB |
| Specific gravity | 0.09 | 0.22 | 0.18 | 0.89 | 0.56 | 0.45 | 0.35 |

TABLE 4

| | Properties of cross-linked foam | | | |
|---|---|---|---|---|
| | Comparative example 9 | Comparative example 10 | Comparative example 11 | Comparative example 12 |
| Copolymer (A) used | Comparative example 3 | Comparative example 3 | Comparative example 4 | Comparative example 4 |
| Vm | 18 | 18 | 20 | 20 |
| TP20-TS1 min | −2.1 | −0.3 | −1.5 | −0.1 |
| Kneadability | AA | AA | AA | AA |
| Shape stability | BB | BB | BB | BB |
| Specific gravity | 0.49 | 0.35 | 0.38 | 0.35 |

Example 18

Production of Copolymer (A1)

A polymerization reactor having a volume of 300 L and being provided with a mixing blade was used, and polymerization of a quaternary copolymer composed of a component [A]: ethylene, a component [B]: propylene, a component [C-1]: 5-ethylidene-2-norbornene (ENB), and a component [C-2]: 5-vinyl-2-norbornene (VNB) was conducted at a temperature of 95° C. continuously.

At this time, hexane (an amount of feed of 41 kg/h) was used as a polymerization solvent, and ethylene at an amount of feed of 5.3 kg/h, propylene at an amount of feed of 5.6 kg/h, ENB at an amount of feed of 900 g/h, VNB at an amount of feed of 90 g/h, and hydrogen at an amount of feed of 100 NL/h were fed into the polymerization reactor continuously. The polymerization pressure was maintained at 1.5 MPa, and (t-butylamide)dimethyl($\eta^5$-2-methyl-s-indacen-1-yl)silane-titanium(II)1,3-pentadiene, which is a compound represented by the above-described formula (VIII), serving as a main catalyst was fed into the polymerization reactor continuously in such a way that the amount of feed became 0.05 mmol/h. As for co-catalysts, each of 0.25 mmol/h of $(C_6H_5)_3CB(C_6F_5)_4$ and 15 mmol/h of triisobutylaluminum (TIBA) was fed into the polymerization reactor continuously.

In this manner, a polymerization solution containing 16.6 percent by weight of copolymer (A1) composed of ethylene, propylene, ENB, and VNB was produced. A small amount of methanol was added to the polymerization solution drawn from the lower portion of the polymerization reactor, so as to terminate the polymerization reaction. After the polymer was separated from the solvent through a steam stripping treatment, drying under reduced pressure was conducted at 80° C. for one whole day and night.

Regarding the resulting copolymer (A1), the structural units derived from propylene were 41.2 percent by mole, the structural units derived from the nonconjugated polyene were 2.76 percent by mole, the molar ratio ([C-1]/[C-2]) of the structural units derived from ENB [C-1] to the structural units derived from VNB [C-2] was 87.3/12.7, the apparent iodine value of the structural units derived from VNB was 1.42 g/100 g, the Mooney viscosity [ML (1+4) 100° C.] was 28, and the activation energy of fluidization (Ea) was 41.2 kJ/mol.

The composition and the property values of the copolymer (A1) are shown in Table 5.

Example 19

Production of Copolymer (A2)

A polymerization reactor having a volume of 300 L and being provided with a mixing blade was used, and polymerization of a quaternary copolymer composed of a component [A]: ethylene, a component [B]: propylene, a component [C-1]: 5-ethylidene-2-norbornene (ENB), and a component [C-2]: 5-vinyl-2-norbornene (VNB) was conducted at a temperature of 95° C. continuously.

At this time, hexane (an amount of feed of 37.5 kg/h) was used as a polymerization solvent, and ethylene at an amount of feed of 3.7 kg/h, propylene at an amount of feed of 3.7 kg/h, ENB at an amount of feed of 2.0 kg/h, VNB at an amount of feed of 67 g/h, and hydrogen at an amount of feed of 20 NL/h were fed into the polymerization reactor continuously. The polymerization pressure was maintained at 2.1 MPa, and (t-butylamide)dimethyl($\eta^5$-2-methyl-s-indacen-1-yl)silane-titanium(II)1,3-pentadiene, which is a compound represented by the above-described formula (VIII), serving as a main catalyst was fed into the polymerization reactor continuously in such a way that the amount of feed became 0.09 mmol/h. As for co-catalysts, each of 0.44 mmol/h of $(C_6H_5)_3CB(C_6F_5)_4$ and 7.0 mmol/h of triisobutylaluminum (TIBA) was fed into the polymerization reactor continuously.

In this manner, a polymerization solution containing 18.0 percent by weight of copolymer (A2) composed of ethylene, propylene, ENB, and VNB was produced. A small amount of methanol was added to the polymerization solution drawn from the lower portion of the polymerization reactor, so as to terminate the polymerization reaction. After the polymer was separated from the solvent through a steam stripping treatment, drying under reduced pressure was conducted at 80° C. for one whole day and night.

Regarding the resulting copolymer (A2), the structural units derived from propylene were 41.1 percent by mole, the structural units derived from the nonconjugated polyene were 4.53 percent by mole, the molar ratio ([C-1]/[C-2]) of the structural units derived from ENB [C-1] to the structural units derived from VNB [C-2] was 96.7/3.3, the apparent iodine value of the structural units derived from VNB was 0.49 g/100 g, the Mooney viscosity [ML (1+4) 100° C.] was 85, and the activation energy of fluidization (Ea) was 37.2 kJ/mol.

The composition and the property values of the copolymer (A2) are shown in Table 5.

TABLE 5

|  | Propylene [mol %] | Nonconjugated polyene [mol %] | [C-1]/[C-2] [mol/mol] | Apparent iodine value [g/100 g] | Mooney viscosity | Activation energy of fluidization [kJ/mol] |
|---|---|---|---|---|---|---|
| Copolymer (A1) | 41.2 | 2.76 | 87.3/12.7 | 1.42 | 28 | 41.2 |
| Copolymer (A2) | 41.1 | 4.53 | 96.7/3.3 | 0.49 | 85 | 37.2 |

Production Example 1

Production of Ethylene Butene Copolymer (B2)

At room temperature, 750 ml of heptane and 0.15 ml of hexane solution (concentration 1.0 mmol/ml) of triisobutylaluminium (TIBA) were put into a SUS autoclave, which had a volume of 1.5 L, which was provided with a mixing blade, and the inside of which had been replaced with nitrogen adequately. The mixing blade was rotated, and 6 g of 1-butene and 150 Nml of hydrogen were put into the autoclave while cooling was conducted with ice. Subsequently, the autoclave was heated to 100° C. and, furthermore, was pressurized with ethylene in such a way that the total pressure became 0.6 MPaG. When the internal pressure of the autoclave reached 0.6 MPaG, nitrogen was injected, 0.38 ml of toluene solution (concentration 0.001 mmol/ml) of [dimethyl(t-butylamide)

(tetramethyl-$\eta^5$-cyclopentadienyl)silane]titanium dichloride and 0.38 ml of toluene solution (concentration 0.004 mmol/ml) of triphenylcarbenium tetrakis(pentafluorophenyl)borate were introduced, so as to initiate polymerization. Thereafter, the temperature of the autoclave was adjusted for 5 minutes in such a way that the internal temperature became 100° C. and, in addition, ethylene was fed directly in such a way that the pressure became 0.6 MPaG. After 5 minutes had elapsed from the start of the polymerization, nitrogen was injected into the autoclave, 5 ml of methanol was introduced to terminate the polymerization, and the autoclave was decompressed to atmospheric pressure. The polymerization solution was agitated and 3 liter of methanol was poured. Drying was conducted at 130° C. for 13 hours under reduced pressure, so that 12 g of ethylene.butene copolymer (B2) was produced. This operation was repeated to collect the ethylene.butene copolymer (B2), followed by melt-kneading.

The ethylene.1-butene copolymer (B2) contained 90 percent by mole of structural units derived from ethylene and 10 percent by mole of structural units derived from 1-butene in 100 percent by mole of total structural units.

The properties of the ethylene.1-butene copolymer (B2) after melt-kneading are shown in Table 6.

TABLE 6

| Polymer properties | Ethylene-1-butene copolymer (B2) |
|---|---|
| Density [g/cm$^3$] | 0.905 |
| Melt flow rate | 1.2 |
| MFR$_{10}$/MFR$_2$ | 9.6 |
| Mw/Mn | 2 |
| B value | 1 |
| T$\alpha\beta$/T$\alpha\alpha$ | 0.3 |

Example 20

MIXTRON BB MIXER (Type BB-4, produced by Kobe Steel, Ltd., volume 2.95 liter, rotor 4WH) was used, and 30 parts by weight of copolymer (A1) produced in Example 18, 77 parts by weight of "Mitsui EPT 3090EM" (trade name; produced by Mitsui Chemicals, Inc., structural units derived from ethylene 58 percent by weight, structural units derived from 5-ethylidene-2-norbornene (ENB) 4.3 percent by weight, Mooney viscosity [ML (1+4) 125° C.] 58, activation energy of fluidization (Ea) 30.5 kJ/mol, amount of oil extension 10 phr) serving as copolymer (B1), 5 parts by weight of zinc oxide serving as the vulcanizing aid, 1 part by weight of stearic acid serving as the processing aid, 130 parts by weight of "Asahi #60" (trade name; produced by ASAHI CARBON CO., LTD.) serving as a reinforcing agent, 30 parts by weight of "Whiton SB" (trade name; produced by SHIRAISHI CALCIUM KAISHA, LTD.) serving as the inorganic filler, 68 parts by weight of "Diana process oil PS-430" (trade name; produced by Idemitsu Kosan Co., Ltd) serving as the softener, and 1 part by weight of "PEG#4000" (trade name; produced by Lion Corporation) serving as the activator were blended and kneaded. As for the kneading condition, the number of revolutions of the rotor was 50 rpm, the floating weight pressure was 3 kg/cm$^2$, and the kneading time was 5 minutes, and the kneading discharge temperature was 145° C.

Subsequently, it was ascertained that the above-described compound after melt-kneading reached 40° C. Thereafter, the above-described compound was blended with 0.5 part by weight of "Sanceler CM-G" (trade name; produced by SANSHIN CHEMICAL INDUSTRY CO. LTD.), 0.5 part by weight of "Sanceler TT" (trade name; produced by SANSHIN CHEMICAL INDUSTRY CO. LTD.), 1.5 parts by weight of "Sanceler BZ" (trade name; produced by SANSHIN CHEMICAL INDUSTRY CO. LTD.), and 0.5 part by weight of "Sanceler 22-C" (trade name; produced by SANSHIN CHEMICAL INDUSTRY CO. LTD.) serving as the vulcanizing accelerators, 0.3 part by weight of sulfur and 1.5 parts by weight of "Sanfel R" (trade name; produced by SANSHIN CHEMICAL INDUSTRY CO. LTD.) serving as the vulcanizing agents, and 7 parts by weight of calcium oxide serving as the moisture absorbent, and kneading was conducted by using a 14-inch roll. As for the kneading condition, roll temperatures were front roll/rear roll=65° C./50° C., roll peripheral speeds were front roll/rear roll=13 rpm/11.5 rpm, a roll gap was 5 mm, and a kneading time was 15 minutes.

Next, the resulting compound was extruded by using a 60-mm diameter extruder equipped with a hose-shaped die (outer diameter 18 mm, inner diameter 13.5 mm) under the condition of a die temperature of 80° C. and a cylinder temperature of 60° C., so as to produce an unvulcanized hose. The resulting formed member was introduced into a vulcanization bath immediately after forming. Cross-linking was effected through heating at a temperature of 220° C. for 5 minutes, so that a cross-linked hose was produced.

The property values of the resulting hose are shown in Table 7. In this regard, the hardness, the tensile strength, and the tensile elongation were measured by using a press sheet formed under the condition of 170° C. and 15 minutes.

Comparative Example 13

A cross-linked rubber was produced in the same manner as in Example 20 except that in Example 20, the copolymer (A1) produced in Example 18 was not used, the amount of the copolymer (B1) "Mitsui EPT 3090EM" was changed from 77 parts by weight to 110 parts by weight, and the amount of "Diana process oil PS-430" (trade name; produced by Idemitsu Kosan Co., Ltd) serving as the softener was changed from 68 parts by weight to 90 parts by weight.

The property values of the resulting cross-linked rubber are shown in Table 7.

TABLE 7

|  | Example 20 | Comparative example 13 |
|---|---|---|
| Copolymer (A1) | 30 | — |
| Copolymer (B1) "Mitsui EPT 3090EM" | 77 | 110 |
| Hardness (type A durometer) | 70 | 70 |
| Tensile strength [MPa] | 11.5 | 11.4 |
| Tensile elongation [%] | 520 | 530 |
| Shrinkage factor [%] | 1.9 | 4.2 |

Example 21

MIXTRON BB MIXER (Type BB-4, produced by Kobe Steel, Ltd., volume 2.95 liter, rotor 4WH) was used, and 30 parts by weight of copolymer (A1) produced in Example 18, 77 parts by weight of "Mitsui EPT 3090EM" (trade name; produced by Mitsui Chemicals, Inc., structural units derived from ethylene 48 percent by weight, structural units derived from 5-ethylidene-2-norbornene (ENB) 5.2 percent by weight, Mooney viscosity [ML (1+4) 125° C.] 59, activation energy of fluidization (Ea) 30.5 kJ/mol, amount of oil extension 10 phr) serving as the copolymer (B1), 5 parts by weight of "META-Z102" (trade name; produced by Inoue Calcium Corporation) serving as the vulcanizing aid, 2 parts by weight of stearic acid serving as the processing aid, 2 parts by weight of "Arquad 2HF" (trade name; produced by Lion Akzo Co., ltd.) serving as the activator, 75 parts by weight of "Asahi #50" (trade name; produced by ASAHI CARBON CO., LTD.) and 15 parts by weight of "Asahi #60G" (trade name; produced by ASAHI CARBON CO., LTD.) serving as the reinforcing agents, 30 parts by weight of "Whiton SB" (trade name; produced by SHIRAISHI CALCIUM KAISHA, LTD.) serving as the inorganic filler, 65 parts by weight of "Diana process oil PS-430" (trade name; produced by Idemitsu Kosan Co., Ltd) serving as the softener, and 0.5 part by weight of "PEG#4000" (trade name; produced by Lion Corporation) serving as the activator were blended and kneaded. As for the kneading condition, the number of revolutions of the rotor was 50 rpm, the floating weight pressure was 3 kg/cm$^2$, and the kneading time was 5 minutes, and the kneading discharge temperature was 145° C.

Subsequently, it was ascertained that the above-described compound after melt-kneading reached 40° C. Thereafter, the above-described compound was blended with 0.8 part by weight of "Sanceler M" (trade name; produced by SANSHIN CHEMICAL INDUSTRY CO. LTD.), 1.5 parts by weight of "Sanceler EZ" (trade name; produced by SANSHIN CHEMICAL INDUSTRY CO. LTD.), and 0.8 part by weight of "Sanceler PZ" (trade name; produced by SANSHIN CHEMICAL INDUSTRY CO. LTD.) serving as the vulcanizing accelerators, 0.8 part by weight of sulfur serving as the vulcanizing agent, 3 parts by weight of "VINIFOR AC-2F" (trade name; produced by EIWA CHEMICAL IND. CO. LTD.) serving as the foaming agent, 2 parts by weight of "CELLPASTE K5" (trade name; produced by EIWA CHEMICAL IND. CO. LTD.) serving as the foaming aid, and 2 parts by weight of calcium oxide serving as the moisture absorbent, and kneading was conducted by using a 14-inch roll. As for the kneading condition, roll temperatures were front roll/rear roll=65° C./50° C., roll peripheral speeds were front roll/rear roll=13 rpm/11.5 rpm, a roll gap was 5 mm, and a kneading time was 15 minutes.

Next, the resulting compound was extruded by using a 60-mm diameter extruder equipped with a tube-shaped die (inner diameter 12 mm, thickness 1.5 mm) under the condition of a die temperature of 80° C. and a cylinder temperature of 60° C., so as to be formed into the shape of a tube. The resulting formed member was introduced into a vulcanization bath immediately after forming. Cross-linking and foaming were effected through heating at a temperature of 230° C. for 5 minutes, so that a sponge rubber was produced.

The property values of the sponge rubber are shown in Table 8.

In Example 21, the shape retention is good as compared with those in Comparative examples 14 and 15. It is clear that outgassing during foaming is suppressed by blending the copolymer (A1) into EPDM, and the specific gravity is reduced effectively.

Comparative Example 14

A sponge rubber was produced in the same manner as in Example 21 except that in Example 21, Mitsui EPT 4021 (trade name; produced by Mitsui Chemicals, Inc., structural units derived from ethylene 51 percent by weight, structural units derived from diene 8.1 percent by weight, Mooney viscosity [ML (1+4) 100° C.] 24) was used instead of the copolymer (A1) produced in Example 18.

The property values of the sponge rubber are shown in Table 8.

Comparative Example 15

A sponge rubber was produced in the same manner as in example 21 except that in Example 21, the copolymer (A1) produced in Example 18 was not used, the used amount of the copolymer (B1) "Mitsui EPT 3090EM" was changed from 77 parts by weight to 110 parts by weight, and the amount of the softener "Diana process oil PS-430" was changed from 65 parts by weight to 62 parts by weight.

The property values of the resulting sponge rubber are shown in Table 8.

TABLE 8

|  | Example 21 | Comparative example 14 | Comparative example 15 |
|---|---|---|---|
| Copolymer (A1) | 30 |  |  |
| Mitsui EPT 4021 |  | 30 |  |
| Copolymer (B1) "Mitsui EPT 3090EM" | 77 | 77 | 110 |
| Vm | 45 | 45 | 49 |
| t5 [min] | 3.3 | 3.3 | 3.4 |
| Specific gravity | 0.54 | 0.62 | 0.59 |
| Shape retention [%] | 85 | 81 | 80 |

Regarding Comparative example 14, in which conventional EPDM instead of the copolymer (A1) was blended in "Mitsui EPT 3090EM", and Comparative example 15, in which only "Mitsui EPT 3090EM" was used, outgassing occurred in foaming easily, it was difficult to reduce the specific gravity, and the resulting sponge rubber had the shape retention lower than that in Example 21.

Example 22

MIXTRON BB MIXER (Type BB-4, produced by Kobe Steel, Ltd., volume 2.95 liter, rotor 4WH) was used, and 70 parts by weight of copolymer (A2) produced in Example 19, 30 parts by weight of "Mitsui EPT 3092M" (trade name; produced by Mitsui Chemicals, Inc., structural units derived from ethylene 66 percent by weight, structural units derived from 5-ethylidene-2-norbornene (ENB) 4.6 percent by weight, Mooney viscosity [ML (1+4) 125° C.] 61, activation energy of fluidization (Ea) 30.9 kJ/mol) serving as the copolymer (B1), 8 parts by weight of "META-Z102" (trade name; produced by Inoue Calcium Corporation) serving as the vulcanizing aid, 2 parts by weight of stearic acid serving as the processing aid, 3 parts by weight of "Aktiplast" (trade name; produced by Rhein Chemie) serving as the activator, 114 parts by weight of "Asahi #55" (trade name; produced by ASAHI CARBON CO., LTD.) serving as the reinforcing agent, 60 parts by weight of "Whiton SB" (trade name; produced by SHIRAISHI CALCIUM KAISHA, LTD.) serving as the inorganic filler, 45 parts by weight of "Diana process oil PS-430" (trade name; produced by Idemitsu Kosan Co., Ltd) serving as the softener, and 1.0 part by weight of "PEG#4000" (trade name; produced by Lion Corporation) serving as the activator were blended and kneaded. As for the kneading condition, the number of revolutions of the rotor was 50 rpm, the floating weight pressure was 3 kg/cm$^2$, and the kneading time was 5 minutes, and the kneading discharge temperature was 145° C.

Subsequently, it was ascertained that the above-described compound after melt-kneading reached 40° C. Thereafter, the above-described compound was blended with 0.7 part by weight of "Sanceler M" (trade name; produced by SANSHIN CHEMICAL INDUSTRY CO. LTD.), 1.3 parts by weight of "NOCCELER MDB" (trade name; produced by OUCHI SHINKO CHEMICAL INDUSTRIAL CO., LTD.), 2.0 parts by weight of "Sanceler BZ" (trade name; produced by SANSHIN CHEMICAL INDUSTRY CO. LTD.), and 1.0 part by weight of "Sanceler 22-C" (trade name; produced by SANSHIN CHEMICAL INDUSTRY CO. LTD.) serving as the vulcanizing accelerators, 1.5 parts by weight of sulfur serving as the vulcanizing agent, 7 parts by weight of calcium oxide serving as the moisture absorbent, and 3 parts by weight of "NEOCELLBORN N100SW" (trade name; produced by EIWA CHEMICAL IND. CO. LTD.) serving as the foaming agent, and kneading was conducted by using a 14-inch roll. As for the kneading condition, roll temperatures were front roll/rear roll=65° C./50° C., roll peripheral speeds were front roll/rear roll=13 rpm/11.5 rpm, a roll gap was 5 mm, and a kneading time was 15 minutes.

Next, the resulting compound was extruded by using a 60-mm diameter extruder equipped with a tube-shaped die (inner diameter 12 mm, thickness 1.5 mm) under the condition of a die temperature of 80° C. and a cylinder temperature of 60° C., so as to be formed into the shape of a tube. The resulting formed member was introduced into a vulcanization bath immediately after forming. Cross-linking and foaming were effected through heating at a temperature of 230° C. for 5 minutes, so that a sponge rubber was produced.

The property values of the sponge rubber are shown in Table 9.

Comparative Example 16

A sponge rubber was produced in the same manner as in example 22 except that in Example 22, the copolymer (A2) produced in Example 19 was not used, 100 parts by weight of "Vistalon V8600" (trade name; produced by ExxonMobil Chemical Corporation, structural units derived from ethylene 51.4 percent by weight, structural units derived from the nonconjugated polyene 9.6 percent by weight, Mooney viscosity [ML (1+4) 125° C.] 92, activation energy of fluidization (Ea) 32.7 kJ/mol) serving as the copolymer (B1) was used instead of 30 parts by weight of "Mitsui EPT 3092M", and in order to make the Mooney viscosity and the scorch time t5 equivalent to those in Example 20, the amount of "Asahi #55" (trade name; produced by ASAHI CARBON CO., LTD.) was changed from 114 parts by weight to 105 parts by weight and the amount of "Diana process oil PS-430" (trade name; produced by Idemitsu Kosan Co., Ltd) was changed from 45 parts by weight to 65 parts by weight.

The property values of the resulting sponge rubber are shown in Table 9.

TABLE 9

| | Example 22 | Comparative example 16 |
|---|---|---|
| Copolymer (A2) | 70 | — |
| Copolymer (B1) "Mitsui EPT 3092M" | 30 | |
| Copolymer (B1) "Vistalon V8600" | | 100 |
| Mooney viscosity of compound [ML(1 + 4)125° C.] | 41 | 41 |
| t5 [min] | 3.6 | 3.6 |
| Specific gravity | 0.54 | 0.54 |
| Shape retention | 83 | 84 |
| The number of blobs [blob/30 cm] | 0 | 27 |

Regarding Example 22, the specific gravity and the shape retention were equivalent to those in Comparative example 16. However, a blob, which represents surface appearance important for the sponge quality, was not observed, so that the surface was improved significantly as compared with that in Comparative example 16.

Example 23

A mixture including 15 parts by weight of the copolymer (A1) produced in Example 18, 85 parts by weight of the ethylene.1-butene copolymer (B2) produced in Production example 1, 3.0 parts by weight of zinc oxide, 0.6 part by weight of dicumyl peroxide (DCP), 0.05 part by mass of triallyl cyanurate [trade name; TAC, produced by Kayaku Akzo Corporation], and 6.0 parts by mass of azodicarbonamide was kneaded with a roll at a roll surface temperature of 120° C. for 10 minutes. Thereafter, forming into the shape of a sheet was conducted.

The resulting sheet was filled in a press die (150 mm long×200 mm wide×15 mm thick). Pressurization and heating were conducted under the condition of 150 kg/cm$^2$, 155° C., and 30 minutes, so that a primary cross-linked foam was produced.

Then, the resulting primary cross-linked foam was subjected to compression molding at 150 kg/cm$^2$ and 155° C. for 10 minutes, so that a secondary cross-linked foam of 160 mm long×250 mm wide×15 mm thick was produced.

The specific gravity, the impact resilience, the tear strength, the Asker C hardness, and the compression set of the resulting secondary cross-linked foam were measured and the results are shown in Table 10.

Incidentally, measurement of MFR of the resulting secondary cross-linked foam was attempted at 190° C. and a load of 2.16 kg. However, no fluidization occurred. That is, the MFR was lower than 0.01 g/10 min.

Comparative Example 17

A secondary cross-linked foam was produced in the same manner as in Example 23 except that in Example 23, the copolymer (A1) was not used and the amount of the ethylene.1-butene copolymer (B2) was changed from 85 parts by weight to 100 parts by weight.

The specific gravity, the impact resilience, the tear strength, the Asker C hardness, and the compression set of the resulting secondary cross-linked foam were measured and the results are shown in Table 10.

Regarding comparative example 17, the compression set is poor as compared with that in Example 23, considering that the specific gravity is equivalent.

Incidentally, measurement of MFR of the resulting secondary cross-linked foam was attempted at 190° C. and a load of 2.16 kg. However, no fluidization occurred. That is, the MFR was lower than 0.01 g/10 min.

TABLE 10

| | Example 23 | Comparative example 17 |
|---|---|---|
| Copolymer (A1) | 15 | — |
| Ethylene•1-butene copolymer (B2) | 85 | 100 |
| Average specific gravity | 0.12 | 0.13 |
| Tear strength (N/cm) | 78 | 77 |
| Asker C hardness | 61 | 62 |
| Compression set (%) | 50 | 70 |

The invention claimed is:

1. A copolymer (A) comprising structural units derived from ethylene [A], an α-olefin [B] having 3 to 20 carbon atoms, a nonconjugated polyene [C-1], in which among carbon-carbon double bonds, only one carbon-carbon double bond polymerizable with a metallocene catalyst is present in one molecule, and a nonconjugated polyene [C-2], in which among the carbon-carbon double bonds, two carbon-carbon double bonds polymerizable with the metallocene catalyst are present in one molecule, and being synthesized through the use of the metallocene catalyst, wherein the nonconjugated polyene [C-1] is 5-ethylidene-2-norbornene (ENB), and the nonconjugated polyene [C-2] is 5-vinyl-2-norbornene (VNB), wherein
   (1) the structural units derived from the α-olefin [B] constitute 10 to 50 percent by mole in 100 percent by mole of the total structural units,
   (2) the total of the percent by mole of the structural units derived from the nonconjugated polyene [C-1] and the percent by mole of the structural units derived from the nonconjugated polyene [C-2] is 1.0 to 6.0 percent by mole,
   (3) the molar ratio of [C-1]/[C-2] is 87.3/12.7 to 99.5/0.5,
   (4) the Mooney viscosity [ML(1+4)100° C.] measured at 100° C. is 10 to 200,
   (5) the following formula (I) is satisfied:

50>activation energy of fluidization (Ea) [kJ/mol]>35    (I), and (6) the apparent iodine value of the structural units derived from the nonconjugated polyene [C-21] is 0.1 to 2.0 g/100 g.

2. The copolymer (A) according to claim 1, wherein (4) the Mooney viscosity [ML (1+4)100° C.] measured at 100° C. is 10 to 90.

3. The copolymer (A) according to claim 1, which is synthesized through the use of a catalyst having the structure represented by the following formula (III'),

[Chemical formula 1]

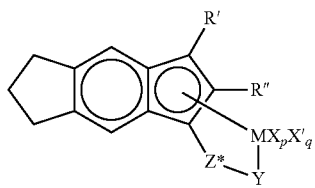

(III')

where in the formula (III'), R' represents a hydrogen atom or a hydrocarbyl group having 1 to 20 carbon atoms, R" represents a hydrocarbyl group having 1 to 20 carbon atoms or a hydrogen atom, M represents titanium, Y represents —NR*—, Z* represents —SiR*$_2$—, the R*s represent independently a hydrogen atom or a hydrocarbyl group having 1 to 20 carbon atoms, one of p and q is 0 and the other is 1, in the case where p is 0 and q is 1, M is in an oxidized state of +2 and X' represents 1,4-diphenyl-1,3-butadiene or 1,3-pentadiene, and in the case where p is 1 and p is 0, M is in an oxidized state of +3, and X represents 2-(N,N-dimethylamino)benzyl.

4. A rubber composition comprising the copolymer (A) according to claim 1.

5. A rubber composition comprising:
   the copolymer (A) according to claim 1; and
   at least one type of ethylene-based polymer (B) selected from the group consisting of an ethylene.α-olefin having 3 to 20 carbon atoms.nonconjugated polyene copolymer (excluding the copolymer (A)) (B1), an ethylene.α-olefin copolymer (B2), and an ethylene.polar monomer copolymer (B3).

6. A rubber composition comprising 100 parts by weight of the copolymer (A) according to claims 3 and 1 to 70 parts by weight of foaming agent.

7. A cross-linked rubber which is produced through cross-linking of the rubber composition according to claim 4.

8. A cross-linked foam which is produced through cross-linking foaming of the rubber composition according to claim 4.

9. A cross-linked foam which is produced through cross-linking foaming of the rubber composition according to claim 4 and has a specific gravity of 0.02 to 0.3.

10. A highly foamed sponge material comprising the cross-linked foam according to claim 9.

11. A heat-insulating sponge comprising the cross-linked foam according to claim 9.

12. A dam rubber comprising the cross-linked foam according to claim 9.

* * * * *